(12) United States Patent
Ishii et al.

(10) Patent No.: US 9,760,222 B2
(45) Date of Patent: Sep. 12, 2017

(54) SEMICONDUCTOR DEVICE AND ERROR CANCELING METHOD

(71) Applicant: Synaptics Japan GK, Tokyo (JP)

(72) Inventors: Tatsuya Ishii, Tokyo (JP); Nobukazu Tanaka, Tokyo (JP); Hiroshi Takeyama, Tokyo (JP); Akihito Akai, Tokyo (JP)

(73) Assignee: Synaptics Japan GK, Tokyo (JP)

( * ) Notice: Subject to any disclaimer, the term of this patent is extended or adjusted under 35 U.S.C. 154(b) by 35 days.

(21) Appl. No.: 14/565,423

(22) Filed: Dec. 10, 2014

(65) Prior Publication Data

US 2015/0169108 A1 Jun. 18, 2015

(30) Foreign Application Priority Data

Dec. 12, 2013 (JP) ................. 2013-256856

(51) Int. Cl.
*G06F 3/044* (2006.01)
*G06F 3/041* (2006.01)

(52) U.S. Cl.
CPC ............ *G06F 3/044* (2013.01); *G06F 3/0418* (2013.01)

(58) Field of Classification Search
CPC ....... G09G 2310/08; G09G 2320/0271; G09G 2320/064; G09G 2320/0646; G09G 2330/021; G09G 2340/0435; G09G 2360/144; G09G 3/3406; G09G 3/3426; G09G 3/3611; G09G 3/3648; G09G 3/3674; G06F 3/0418; G06F 3/044; G06F 3/016
See application file for complete search history.

(56) References Cited

U.S. PATENT DOCUMENTS

| 2007/0257890 A1 | 11/2007 | Hotelling et al. | |
| 2010/0328274 A1* | 12/2010 | Noguchi | G02F 1/13338 345/204 |
| 2011/0254802 A1* | 10/2011 | Philipp | G06F 3/0412 345/174 |
| 2012/0050217 A1* | 3/2012 | Noguchi | G06F 3/0412 345/174 |
| 2013/0082977 A1* | 4/2013 | Noguchi | G06F 3/0412 345/174 |
| 2013/0093722 A1* | 4/2013 | Noguchi | G06F 3/0412 345/174 |

(Continued)

FOREIGN PATENT DOCUMENTS

WO WO 2013/117877 * 8/2013

*Primary Examiner* — Md Saiful A Siddiqui
(74) *Attorney, Agent, or Firm* — Patterson + Sheridan, LLP

(57) ABSTRACT

Embodiments herein include a device, system, and method for periodically capturing sensing signals using one or more detection electrodes to generate data for detecting an object proximate to the detection electrodes. The sensing signals are captured during detection periods within periodic detection cycles where each of the detection cycles define a period of time between consecutive detection periods. In addition, the device, system and method set a duration of the detection cycle to 1/m (where m is appositive integer) of a duration of a display-scan cycle. The value of m is selected based on a periodic noise signal. Thus, the device, system, and method may prevent a periodic noise signal which has a cycle that is longer than the detection period from worsening the accuracy of touch detection.

18 Claims, 14 Drawing Sheets

(56) References Cited

U.S. PATENT DOCUMENTS

| | | | |
|---|---|---|---|
| 2013/0234954 A1* | 9/2013 | Koide | G06F 3/0488 345/173 |
| 2014/0009408 A1* | 1/2014 | Lee | G06F 3/041 345/173 |
| 2015/0035794 A1* | 2/2015 | Zhitomirskiy | G06F 3/044 345/174 |

* cited by examiner

SEMICONDUCTOR DEVICE AND ERROR CANCELING METHOD

CROSS-REFERENCE TO RELATED APPLICATIONS

The Present application claims priority from Japanese application JP 2013-256856 filed on Dec. 12, 2013, the content of which is hereby incorporated by reference into this application.

BACKGROUND

The present invention relates to a semiconductor device having the function of controlling touch detection on a touch panel, a method for canceling the periodic noise influence on a periodic signal capturing action, and a technique useful in application to a semiconductor control device operable to control e.g. a touch panel integrated with a liquid crystal display panel.

The applicant has proposed a technique that may be used for preventing a decrease in the accuracy of touch detection owing to extraneous noise, such as AC charger noise of a portable information terminal device having a touch panel incorporated therein in the related art (Japanese Patent Application No. 2012-216745), which has not been laid open yet. Specifically, the output voltage of an AC charger can fluctuate together with the local ground voltage of the AC charger at a predetermined frequency. Regarding the global ground outside the touch panel with respect to the local ground, the above phenomenon may cause the global ground to also fluctuate at the same frequency. Therefore, with a finger in conduction with the global ground or the like brought close to the touch panel, a surface voltage which acts on the touch panel through a stray capacitance produced by the finger or the like is periodically changed in synchronization with this frequency. In case that the cycle of the change coincides with the touch detection cycle, or is an integer multiple thereof, a particular voltage is periodically applied to the detection circuit, and as a result of the accumulation of such voltage, considerable noise is produced, which ends up worsening the accuracy of touch detection. The extraneous noise problem (AC charger problem) like this is based on the assumption that the accuracy of touch detection is worsened by noises caused by periodically scanning a display panel and by gradation drive signal changes unless the timing of touch detection is changed relative to the periodic display scanning and the gradation drive signal changes. This point must be taken into consideration. Therefore, making an attempt to solve the AC charger problem by changing the unit of a touch detection cycle with respect to display scan and gradation drive cycles, the touch panel is put in danger of being influenced by noises caused by scan and gradation drive signal changes. Hence, the related art described above makes it possible to select a detection period in each cycle of the integrating action without switching the frequency of performing the detecting action. The technique according to the related art cannot solve the problem: the AC charger problem cannot be solved by simple application of a technique arranged so that a touch panel is driven by using drive pulses that are of different frequencies in order to reduce noise in a detection cycle of an electrostatic capacitance type touch panel and parts of results of detection which suffer when just a small influence of noise is present.

An example of the above technique in connection with an electrostatic capacitance type touch panel is disclosed in the International Patent Publication No. 2009-535742.

SUMMARY

In one embodiment of the invention, a semiconductor device includes a capacitive sensing controller operable to periodically capture sensing signals using one or more detection electrodes to generate data for detecting an object proximate to the detection electrodes. Moreover, the sensing signals are captured during detection periods in periodic detection cycles, each detection cycle defining a period of time between consecutive detection periods. The device also includes a processor operable to set a duration of the detection cycles, wherein the duration of the detection cycles is 1/m (where m is a positive integer) of a duration of a display-scan cycle, wherein m is selected based on an periodic noise signal.

In another embodiment of the invention, a semiconductor device includes a display controller operable to update a display panel in synchronization with a display-scan cycle and a capacitive sensing controller operable to detect detection data according to capacitance between drive and detection electrodes by periodically capturing sensing signals on the detection electrodes. Moreover, detecting the detection data is synchronized with the display-scan cycle where the capacitive sensing controller performs the periodic capture during detection periods in periodic detection cycles, each detection cycle defining a period of time between consecutive detection periods. Further, a duration of the detection cycles is 1/m (where m is a positive integer) of a duration of the display-scan cycle, wherein m is selected based on an periodic noise signal.

In another embodiment, a noise reduction method includes capturing sensing signals using one or more detection electrodes to generate detection data associated with an object proximate to the detection electrodes, where the sensing signals are captured during detection periods in periodic detection cycles, each detection cycle defining a period of time between consecutive detection periods. The method also includes setting a duration of the detection cycles, based on a periodic noise signal, such that a duration of the detection cycles is 1/m (where m is a positive integer) of a duration of a display-scan cycle.

BRIEF DESCRIPTION OF THE DRAWINGS

FIG. 12 is a block diagram schematically showing, by example, a portable information terminal device as an example of an electronic device which a touch panel is applied to;

DETAILED DESCRIPTION

Introduction

Figure 1:
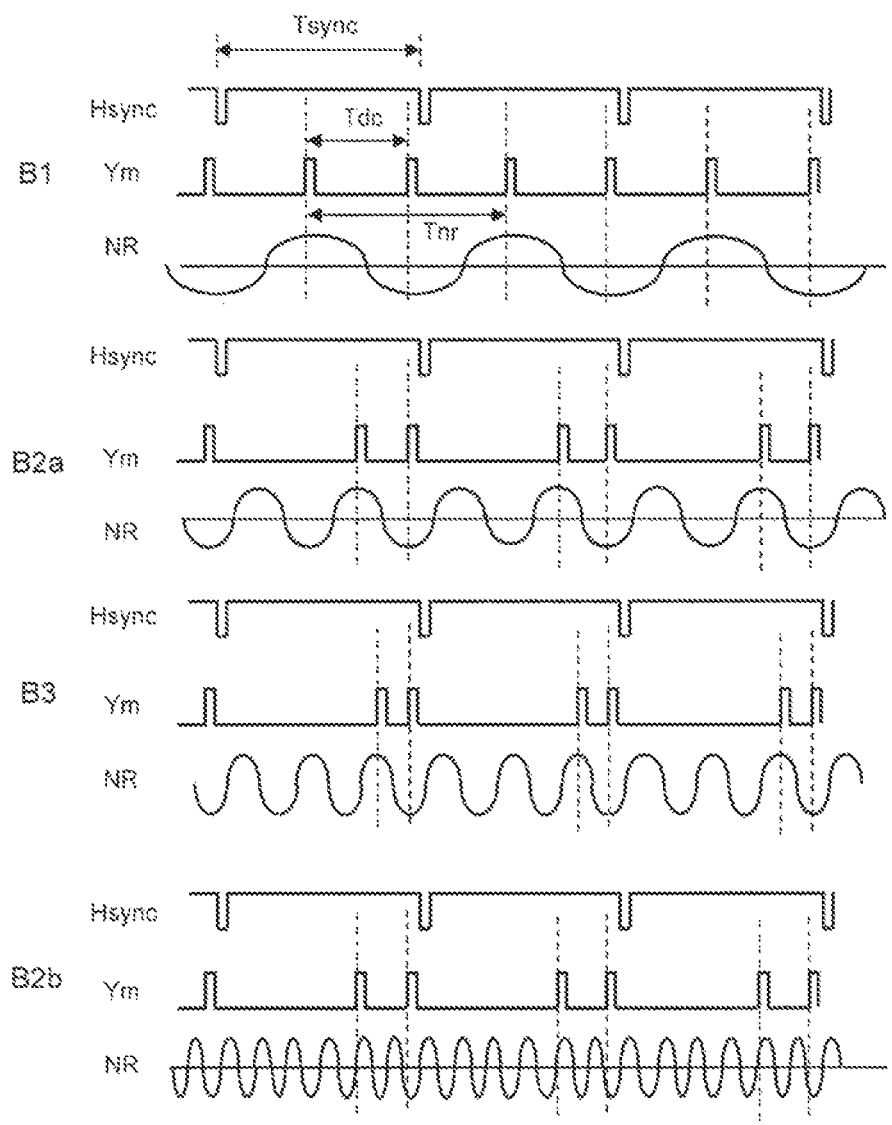
FIG. 1 is a waveform diagram showing, by example, forms for setting a detection cycle Tdc according to the cycle Tnr of extraneous noise NR.

The inventor has studied about the reduction in the influence of extraneous noise according to the related art. That is, it is ideal in the related art that a detection period in each cycle of the integrating action of the touch panel is made coincident with or an integer multiple of a cycle of extraneous noise. Therefore, in case that the cycle of extraneous noise is longer than a detection period, it is impossible to cope with such extraneous noise. Today, there is the tendency that a display screen of higher definition shortens a display-scan cycle. The inventor has found that with such tendency, a detection period is shortened, and a frequency of extraneous noise which can be coped with is limited to a high frequency, which can make impossible to prevent the accuracy of touch detection attributed to extraneous noise from being worsened.

The above and other problems, and novel features thereof will be apparent from the description hereof and the accompanying diagrams.

Of the embodiments herein disclosed, the representative embodiment will be briefly outlined below.

In the detecting action of periodically capturing signals arising on detection electrodes through capacitance components between drive and detection electrodes of a touch panel, a cycle of an odd multiple of a half of $1/m$ (m is a positive integer) of a display-scan cycle is adopted as a detection cycle to capture the periodic signals. In addition, adopting a period of an integer multiple of $1/m$ (m is a positive integer) of a display-scan cycle together with the detection cycle as a detection period of each cycle to periodically capture in by use of the detection cycle makes interference with nothing.

In other words, supposing that the display-scan cycle is denoted by Tsync, the touch detection action in synchronization therewith is subjected to the accumulated influence of extraneous noise of a cycle of Tsync/m. The cycle Tnr of extraneous noise, the influence of which is not desired, satisfies Tnr=Tsync/m. Therefore, the detection cycle Tdc is set to meet $Tdc=Tsync \times (2 \times n-1)/m \times 2$ and most preferably, it is set to satisfy $Tdc=Tnr \times (2 \times n-1)/2$. The detection period (Tdt), the adoption of which is subjected to no interference, is set as $Tdt=Tsync \times n/m$, and it is the most preferable to set $Tdt=Tnr \times n$.

The effect brought about by the representative embodiment of the embodiments herein disclosed will be briefly described below.

It is possible to prevent extraneous noises having cycles longer than a touch detection period from worsening the accuracy of touch detection.

1. Summary of the Embodiments

First, summary of representative embodiments of the invention disclosed in the application will be described. Reference numerals in drawings in parentheses referred to in description of the summary of the representative embodiments just denote components included in the concept of the components to which the reference numerals are designated.

[1] Semiconductor Device Including a Touch Panel Controller and a Data Processor with the Detection Cycle $Tdc=Tsync \times (2 \times n-1)/(2 \times m)$ is Set In one embodiment, a semiconductor device includes: a touch panel controller operable to periodically capture signals arising on detection electrodes through capacitance components between drive electrodes and the detection electrodes of a touch panel, and to create detection data according to the capacitance components; and a data processor. The touch panel controller includes a control circuit operable to control detection cycles (Tdc) to periodically capture the signals in, and a detection period (Tdt) in each cycle. The data processor sets the detection cycle and the detection period on the control circuit, and makes the touch panel controller create the detection data, and performs an arithmetic calculation process for determining a touch position based on the detection data thus created according to the setting. A detection cycle set by the data processor is a cycle of an odd multiple of a half of 1/m (m is a positive integer) of a display-scan cycle defined by timing signals. That is, supposing that the display-scan cycle is denoted by Tsync, the detection cycle Tdc is given as Tdc=Tsync×(2×n−1)/(m× 2) (n is a positive integer).

In one embodiment, extraneous noise that worsens the accuracy of touch detection is synchronized with a display-scan cycle, and has a cycle of 1/m of the display-scan cycle (Tnr=Tsync/m). Adopting a cycle of an odd multiple of a half of 1/m of the display-scan cycle as a detection cycle allows the polarity of extraneous noise to be inverted in each detection cycle and therefore, the influence of extraneous noise can be cancelled in two consecutive detection periods of the detection cycle. The influence of extraneous noise of a particular frequency can be curbed by setting such a detection cycle. Further, the effect of preventing the accuracy of touch detection from being worsened can be brought about on extraneous noises longer in cycle than the touch detection period which may occur in higher definition displays which shorten the display-scan cycle and the touch detection period. Many of cheap AC chargers generate periodic noises. However, it is possible to conduct touch detection even in the case of using an AC charger that produces periodic noise. Therefore, the embodiment can contribute to the reduction in cost of a system to which touch detection is applied.

[2] Use of a Detection Cycle (Tdc=Tnr×(2×n−1)/2) which can Cancel Extraneous Noise in Synchronization with a Display-Scan Cycle In one embodiment, the data processor in the semiconductor device described above makes an assessment to determine what detection cycle (Tdc) is closest to being equal to an odd multiple of a half of the cycle period (Tnr=Tsync/m) of a period noise signal. Moreover, the noise signal has a cycle of 1/m of the display-scan cycle based on detection data according to detection cycles created by the touch panel controller. The data processor uses, for determination of a touch position, detection data derived using the detection cycle determined using this assessment. That is, the detection cycle Tdc which is most suitable for cancelling extraneous noise in synchronization with the display-scan cycle has the relation given by Tdc=Tnr×(2× n−1)/2.

In this embodiment, in consideration of extraneous noise that worsens the accuracy of touch detection is noise which is in synchronization with the display-scan cycle, and which has a cycle of 1/m of the cycle (Tnr=Tsync/m), a touch position can be determined by use of an optimum detection cycle based on results of the assessment on the extraneous noise.

[3] Detection Period Setting Satisfying Tdt=Tsync×n/m

In one embodiment, the touch panel controller in the semiconductor device described above includes a detection period of each cycle of periodic integration specified by detection-cycle-set data for setting the detection cycle as specified by detection-period-set data. A detection period defined by the detection-period-set data is a period of an integer multiple of 1/m of a display-scan cycle. That is, a period which meets Tdt=Tsync×n/m is set as the detection period Tdt.

In this embodiment, the data processor further sets, as the detection period, a period of an integer multiple of 1/m of the display-scan cycle, which allows the polarity of extraneous noise to be inverted in each detection period. As a result, it becomes possible to cancel the influence of extraneous noise in each detection period. Therefore, the synergistic effect can be expected for the reduction in the influence of extraneous noise in consideration of both of a detection cycle and a detection period.

[4] Use of a Detection Cycle (Tdc=Tnr×(2×n−1)/2=Tsync× (2×n−1)/(2×m)) and a Detection Period (Tdt=Tnr× n=Tsync×n/m) for Canceling Extraneous Noise Components in Synchronization with the Display-Scan Cycle In one embodiment, the touch panel controller creates the detection data by a detection cycle and a detection period specified by detection-cycle-set data and detection-period-set data. The data processor makes an assessment, based on detection data on detection cycles and detection periods, concerning what detection cycle is most nearly in a first relation (Tdc=Tnr×(2×n−1)/2=Tsync×(2×n−1)/(2×m)) where the detection cycle is equal to a cycle of an odd multiple of a half of the cycle of extraneous noise having a cycle of 1/m of the display-scan cycle. The data processor further determines what detection period (Tdt) is most nearly in a second relation (Tdt=Tnr×n=Tsync×n/m) in which the detection period is equal to a period of an integer multiple of a cycle of the extraneous noise. The data processor uses, for determination of a touch position, detection data based on the detection cycle and detection period which are determined using this assessment.

According to the embodiment like this, it is possible to determine a touch position by use of optimum detection cycle and detection period based on results of the assessment despite the effects of the extraneous noise. This is achieved by knowing that extraneous noise that worsens the accuracy of touch detection is synchronized with the display-scan cycle, and has a cycle of 1/m of the cycle (Tnr=Tsync/m).

[5] Change of Detection-Cycle-Set Data and Detection-Period-Set Data

In one embodiment, the data processor individually sets and changes detection-cycle-set data and detection-period-set data which are set on the control circuit.

Thus, even if the frequency of extraneous noise changes with time, the detection cycle and the detection period can be optimized by tracking this change.

[6] Non-Volatile Memory Having Pulse-Cycle-Set Data Stored Therein

In one embodiment, the data processor has a non-volatile memory used to store detection-cycle-set data for specifying a cycle of an odd multiple of a half of 1/m of a display-scan cycle.

Using the non-volatile memory, it is possible to access previous detection-cycle-set data for a particular display-scan cycle. Moreover, the detection-cycle-set data can be used set the initial duration or other timing of a detection cycle as well as any changes made thereafter.

[7] Non-Volatile Memory Having Detection-Cycle-Set Data and Detection-Period-Set Data Stored Therein In one embodiment, the data processor has a non-volatile memory that stores detection-cycle-set data for specifying a cycle of an odd multiple of a half of 1/m of a display-scan cycle, and detection-period-set data for specifying a detection period of an integer multiple of 1/m of the display-scan cycle.

Using the non-volatile memory, it is possible to access previous detection-cycle-set data and detection-period-set data for a particular display-scan cycle, and these data can be used to set the initial duration or other timings of a detection cycle and detection period as well as any changes made thereafter.

[8] Display Controller

In one embodiment, the semiconductor device further includes: a display controller operable to supply gradation signals to signal electrodes of a display panel in synchronization with driving of scan electrodes in each display-scan cycle of the display panel.

Using the display controller, the semiconductor device can control of the touch panel controller and the display controller so that the controllers are operated in synchronization with a display-scan cycle.

[9] Suitability Assessment of Touch Detection, Noise Detection, $Tdc=Tnr\times(2\times n-1)/2$ In one embodiment, the touch panel controller performs touch detection and noise detection by the periodic capture of a detection cycle specified by detection-cycle-set data. During touch detection, the touch panel controller drives the drive electrodes with a cycle in synchronization with the detection cycle to perform the periodic capture. During noise detection, the touch panel controller stops driving the drive electrodes to perform the periodic capture. The data processor makes an assessment concerning what detection cycle is most nearly in a relation (a first relation) in which the detection cycle is equal to a cycle of an odd multiple of a half of the cycle of extraneous noise having a cycle of 1/m of the display-scan cycle based on data according to detection cycles obtained during noise detection. The data processor performs the touch position determination based on data obtained in the touch detection. The data processor uses, for touch position determination, data based on a detection cycle which is identified by performing this assessment.

Thus, the semiconductor device can determine a touch position by use of an optimum detection cycle even in the presence of the extraneous noise. This is achieved by knowing that extraneous noise that worsens the accuracy of touch detection is synchronized with a display-scan cycle and has a cycle of 1/m of the display-scan cycle ($Tnr=Tsync/m$). Unlike touch detection, the activation of the drive electrodes of the touch panel is stopped during noise detection. So it is not required to factor in whether the touch panel is being touched or not for making determination about whether the detection cycle satisfies the first relation or not. Hence, such determination is facilitated, which contributes to the increase in the accuracy of such determination.

[10] Pulse Width Setting Satisfying $Tdt=Tsync\times n/m$

In one embodiment, the touch panel controller further sets a detection period of each cycle of the periodic capture to a detection period specified by detection-period-set data to perform the touch detection and noise detection. A detection period defined by the detection-period-set data is a period of an integer multiple of 1/m of a display-scan cycle.

In one example, the data processor further sets, as a detection period, a period of an integer multiple of 1/m of the display-scan cycle, which enables the polarities of extraneous noises to be inverted in a detection period. Hence, the influence of extraneous noises can be canceled in each detection period. Therefore, the synergistic effect can be expected for the reduction in the influence of extraneous noise, considering not only a detection cycle, but also a detection period.

[11] Change of Detection-Cycle-Set Data and Detection-Period-Set Data

In one embodiment, the data processor individually sets and changes detection-cycle-set data and detection-period-set data which are set on the control circuit.

According to the embodiment like this, even if the frequency of extraneous noise changes with time, the detection cycle and detection period can be optimized by tracking this change.

[12] Suitability Assessment of Touch Detection, Noise Detection, $Tdc=Tnr\times(2\times n-1)/2$, $Tdt=Tnr\times n$ In one embodiment, the touch panel controller performs touch detection and noise detection by the periodic capture according to a detection cycle and a detection period specified by detection-cycle-set data and detection-period-set data. During touch detection, the touch panel controller drives the drive electrodes with a cycle in synchronization with the detection cycle to perform the periodic capture. During noise detection, the touch panel controller stops driving the drive electrodes to perform the periodic capture. The data processor performs determination of a touch position based on data obtained by the touch detection. The data processor makes an assessment, based on data according to detection cycles and detection periods obtained by the noise detection, concerning what detection cycle (Tdc) is most nearly in a first relation where the detection cycle is equal to a cycle of an odd multiple of a half of the cycle of extraneous noise having a cycle of 1/m of the display-scan cycle, and further what detection period is most nearly in a second relation where the detection period is equal to a period of an integer multiple of a cycle of the extraneous noise. The data processor performs control so as to use, for determination of a touch position, detection data based on the detection cycle and the detection period which are determined to by the assessment.

In one example, it is possible to determine a touch position by use of optimum detection cycle and detection period even in the presence of extraneous noise based on results of the assessment referred above. This is achieved by knowing that noise that worsens the accuracy of touch detection is synchronized to a display-scan cycle and has a cycle of 1/m of the display-scan cycle ($Tnr=Tsync/m$). Unlike touch detection, the activation of the drive electrodes of the touch panel is stopped during noise detection. So it is not required to factor in whether the touch panel is being touched or not for making the determination about what detection cycle is most nearly in the first relation, and the determination about what detection period is most nearly in the second relation. Thus, such determinations are facilitated, which contributes to an increase in the accuracy of such determinations.

[13] Change of Detection-Cycle-Set Data and Detection-Period-Set Data

In the previous embodiment, the data processor may individually set and change the detection-cycle-set data and detection-period-set data on the control circuit.

In this embodiment, even if the frequency of extraneous noise changes with time, the detection cycle and the detection period can be optimized by tracking the change.

[14] Detection Cycle Setting Involving the Display Controller and the Touch Panel Controller, and Satisfying $Tdc=Tsync\times(2\times n-1)/m\times 2$ In one embodiment, a semiconductor device includes: a display controller operable to perform activation control of a display panel in synchronization with a display-scan cycle; and a touch panel controller operable to perform control to detect detection data according to capacitance components between drive and detection electrodes of a touch panel by periodically capturing signals arising on the detection electrodes through the capacitance components while synchronizing with the display controller. The touch panel controller performs the periodic capture in a detection cycle specified by detection-cycle-set data. A duration of the detection cycle defined by the detection-cycle-set data is an odd multiple of a half of the periodic noise signal. Furthermore, the duration of the detection cycles is 1/m of the display-scan cycle (where m is a positive integer).

According this embodiment, adopting a duration of the detection cycle that is an odd multiple of a half of the cycle period of the extraneous noise signal allows the polarity of extraneous noise to be inverted in each detection cycle and therefore, the influence of extraneous noise can be cancelled in two consecutive detection periods of the detection cycle. The influence of extraneous noise of a particular frequency can be curbed by setting such a detection cycle. Further, the effect of preventing the accuracy of touch detection from being worsened can be achieved even in the presence of extraneous noises that are longer in cycle than the touch detection period which may occur in higher definition displays that shorten the display-scan cycle and shorten the touch detection period relative to previous displays. Many AC chargers generate periodic noises. However, it is possible to conduct touch detection even in the case of using an AC charger involving larger periodic noise with longer cycles. Therefore, the embodiment can contribute to the reduction in cost of a system to which touch detection is applied.

[15] Detection Period Setting Satisfying Tdt=Tsync×n/m

In one embodiment, the touch panel controller generates a detection period of each cycle of the periodic capture specified by the detection-cycle-set data as specified by detection-period-set data. A detection period defined by the detection-period-set data is a period of an integer multiple of 1/m of a display-scan cycle.

According to this embodiment, the data processor further sets, as a detection period, a period of an integer multiple of 1/m of the display-scan cycle, which enables the polarities of extraneous noises to be inverted in a detection period. Hence, the influence of extraneous noises can be canceled in each detection period. Therefore, the synergistic effect can be expected for the reduction in the influence of extraneous noise, considering not only a detection cycle, but also a detection period.

[16] Detection Cycle Setting Satisfying Tdc=Tsync×(2×n−1)/m×2

In one embodiment, a semiconductor device periodically captures signals arising on detection electrodes through capacitance components between drive electrodes and the detection electrodes of a touch panel, and creates data according to the capacitance components. The semiconductor device includes: a control circuit operable to control a detection cycle in connection with the periodic capture, and a detection period in each cycle; and a memory circuit for storing detection-cycle-set data which define the detection cycle. Detection cycles defined by detection-cycle-set data stored in the memory circuit have a duration that is an odd multiple of a half of a cycle period of the extraneous noise signal.

In one embodiment, adopting a such a duration for the detection cycle allows the polarity of extraneous noise to be inverted in each detection cycle and therefore, the influence of extraneous noise can be cancelled in two (consecutive) detection periods of the detection cycle. The influence of extraneous noise of a particular frequency can be curbed by setting such a detection cycle. Further, the effect of preventing the accuracy of touch detection from being worsened can achieved even in the presence of extraneous noises that are longer in cycle than the touch detection period. While many AC chargers cause large periodic noises, the touch detection can be performed even in the case of using an AC charger with large periodic noise with longer cycles. So, it is possible to contribute to the reduction in cost of a system to which the touch detection is applied.

[17] Detection Period Setting Satisfying Tdt=Tsync×n/m

In the semiconductor device as described above, the memory circuit may further include a region for storing detection-period-set data which define the detection period. In one embodiment, one or more of the detection periods defined by detection-period-set data stored in the memory circuit is a period of an integer multiple of 1/m of a display-scan cycle.

According one embodiment, the data processor further sets, as a detection period, a period of an integer multiple of 1/m of the display-scan cycle, which enables the polarities of extraneous noises to be inverted in a detection period. Hence, the influence of extraneous noises can be canceled in each detection period. Therefore, the synergistic effect can be expected for the reduction in the influence of extraneous noise, considering not only a detection cycle, but also a detection period.

[18] Non-Volatile or Volatile Memory Circuit

In the semiconductor device as described above, the memory circuit is an electrically rewritable non-volatile memory having detection-cycle-set data and detection-period-set data written therein, or a volatile memory (320) which includes the detection-cycle-set data and detection-period-set data therein.

In this example, putting detection-cycle-set data and detection-period-set data according to a display-scan cycle to be used in the non-volatile memory in advance is convenient for initial setting of the detection cycle and detection period and for changing the settings of the detection cycle and the detection period. Even if such non-volatile memory is not provided, the same effect can be achieved by receiving detection-cycle-set data and detection-period-set data from outside a semiconductor device according to a display-scan cycle to be used, and then storing such data in the volatile memory.

[19] Detection Cycle Setting Involving the Display Controller and the Touch Panel Controller, and Satisfying Tdc=Tsync×(2×n−1)/m×2 in Touch Detection and Noise Detection In one embodiment, a semiconductor device includes a display controller operable to perform activation control of a display panel in synchronization with a display-scan cycle and a touch panel controller operable to detect detection data according to capacitance components between drive and detection electrodes of a touch panel by periodically capturing signals arising on the detection electrodes through the capacitance components while synchronizing with the display controller. The touch panel controller performs touch detection and noise detection by the periodic capture with a detection cycle specified by detection-cycle-set data. In the touch detection, the touch panel controller drives the drive electrodes to perform the periodic capture with a cycle that is synchronized with the detection cycle. In the noise detection, the touch panel controller stops driving the drive electrodes to perform the periodic capture. A detection cycle defined by the detection-cycle-set data is a cycle of an odd multiple of a half of 1/m of the display-scan cycle (m is a positive integer).

In one embodiment, extraneous noise that decreases the accuracy of touch detection is synchronized with a display-scan cycle and has a cycle of 1/m of the display-scan cycle (Tnr=Tsync/m). Adopting a cycle period that is an odd multiple of a half of the extraneous noise signal as a detection cycle allows the polarity of the extraneous noise to be inverted in each detection cycle, and thus, the influence of extraneous noise can be cancelled in two detection periods of the detection cycle. The influence of extraneous noise of a particular frequency can be curbed by setting such a detection cycle. Further, the effect of preventing the accuracy of touch detection from being worsened can be achieved even in the presence of extraneous noises having a longer cycle than the touch detection period. Moreover, even in the case of an AC charger which causes large periodic noise, the touch detection can be performed and therefore, it is possible to reduce the cost of a system to which the touch detection is applied. Still further, unlike touch detection, the activation of the drive electrodes of the touch panel is stopped during noise detection, so it is not required to factor in whether the touch panel is being touched or not for making determination about whether the detection cycle satisfies the first relation or not. Hence, such determination is facilitated, which contributes to the increase in the accuracy of such determination.

[20] Detection Period Setting Satisfying $Tdt=Tsync \times n/m$

In one embodiment, the touch panel controller further sets a detection period of each cycle of the periodic capture to a detection period specified by detection-period-set data to perform the touch detection and noise detection. A detection period defined by the detection-period-set data is a period of an integer multiple of 1/m of a display-scan cycle.

According to the embodiment like this, the data processor further sets, as a detection period, a period of an integer multiple of 1/m of the display-scan cycle, which enables the polarities of extraneous noises to be inverted in a detection period. Hence, the influence of extraneous noises can be canceled in each detection period. Therefore, a synergistic effect can be achieved for the reduction in the influence of extraneous noise by considering not only a detection cycle, but also a detection period.

[21] Error Canceling Method by Setting a Detection Cycle and Satisfying $Tdc=Tsync \times (2 \times n-1)/(2 \times m)$ The error canceling method includes a capturing action for periodically capturing signals arising on second capacitive sensing electrodes having first and second electrodes while synchronizing with a reference cycle, in which error components produced by periodic extraneous noises superposed on the first electrodes are canceled out. The error canceling method includes: the first step (Ssm1, Ssm2, Ssm3); and the second step (FAL1, FAL2). The first step is one of preparing detection-cycle-set data which define a detection cycle of the capturing action. The second step is one of discriminating suitable data to cancel the error components and obtain results of the capturing action from among detection-cycle-set data prepared in the first step. Each detection cycle defined by the detection-cycle-set data is a cycle of an odd multiple of a half of 1/m (m is a positive integer) of a reference cycle.

According this embodiment, extraneous noise in the capturing action is synchronized with a reference cycle, and having a cycle of 1/m of the cycle (Tnr=Tsync/m). Therefore, adopting a cycle of an odd multiple of a half of 1/m of the reference cycle as a detection cycle allows the polarity of the noise to be inverted in each detection cycle and therefore, the influence of extraneous noise can be cancelled in two detection periods of the detection cycle. That is, the influence of extraneous noise at a particular frequency can be curbed by setting a detection cycle to particular value. In addition, it is possible to prevent a decrease in accuracy for the captured data in the presence of extraneous noises with cycles that are longer than a capturing period.

[22] Detection Cycle Determination Satisfying the Relation of $Tdc=Tnr \times (2 \times n-1)/2$ to Noise Cycle (Tnr=Tsync/m)

In the error canceling method described above, the suitable data discriminated in the second step are detection-cycle-set data, in which the detection cycle (Tdc) is most nearly in a relation where the detection cycle is equal to a cycle of an odd multiple of a half of the cycle (Tnr=Tsync/m) of extraneous noise having a cycle of 1/m of the reference cycle in comparison to unsuitable data.

Accordingly, by knowing that the extraneous noise is synchronized with the reference cycle, and has a cycle of 1/m of a reference cycle (Tnr=Tsync/m), the capturing action is enabled by use of an optimum detection cycle against extraneous noises.

[23] Error Canceling Method Based on Detection Period Setting and Satisfying $Tdt=Tsync \times n/m$ The error canceling method as described above may also include: a third step (Ssm1, Ssm2, Ssm3) of preparing detection-period-set data which defines a detection period of the detection cycle and a fourth step (FAL1, FAL2) of discriminating suitable data to cancel the error components and obtain results of the capturing action from among detection-period-set data prepared in the third step. More than one detection period (Tdt) defined by the detection-period-set data is a period of an integer multiple of 1/m of a reference cycle.

In one embodiment, the data processor further sets, as the detection period, a period of an integer multiple of 1/m of the reference cycle, which allows the polarity of extraneous noise to be inverted in each integration period. As a result, it becomes possible to cancel the influence of extraneous noise in each detection period. Therefore, the synergistic effect discussed above can be achieved in the influence of extraneous noise.

[24] Detection Period Determination Satisfying the Relation $Tdt=Tnr \times n$ with Respect to Noise Cycle (Tnr=Tsync/m)

In the error canceling method as described the previous section, the suitable data discriminated in the fourth step are detection-period-set data, in which the detection period (Tdt) satisfies the relation in which the detection period is equal to a period of an integer multiple of a cycle (Tnr=Tsync/m) of the noise in comparison to unsuitable data.

According this embodiment, by knowing that the extraneous is synchronized with the reference cycle, and has a cycle of 1/m of a reference cycle (Tnr=Tsync/m), the capturing action is enabled by use of an optimum detection cycle and a detection period against extraneous noises.

2. Further Detailed Description of the Embodiments

Figure 12:
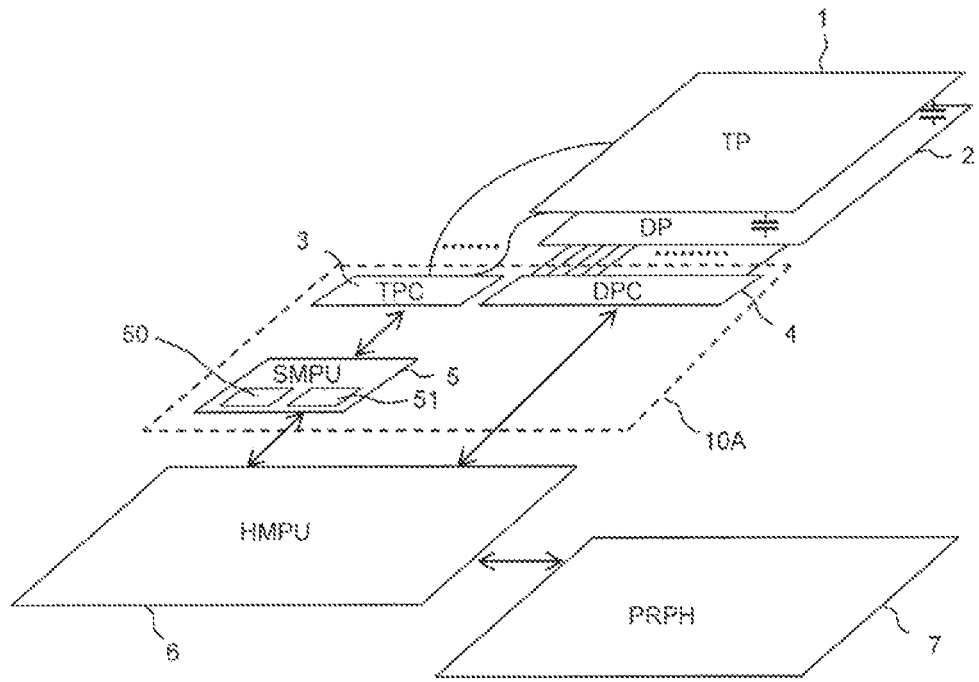

The embodiments will be described further in detail.
Electronic Device with a Touch Panel FIG. 12 schematically shows a portable information terminal device (PDA: Personal Digital Assistant) as an example of an electronic device with a touch panel.

Figure 13:
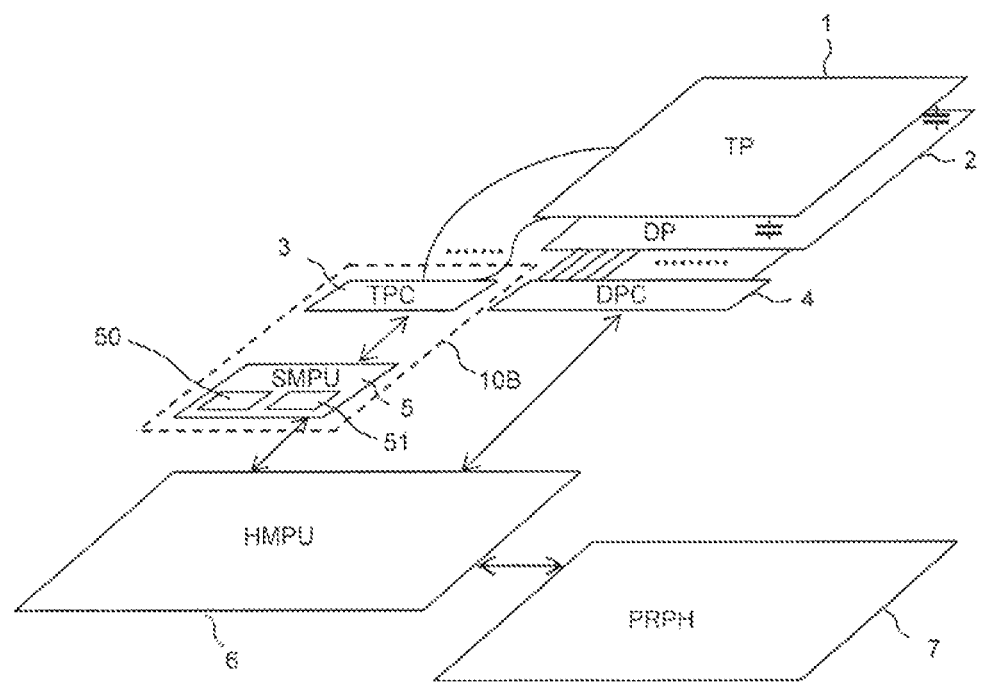
FIG. 13 is a block diagram schematically showing, by example, a portable information terminal device having a semiconductor device in a semiconductor chip including a touch panel controller and a subprocessor formed therein.
Figure 14:
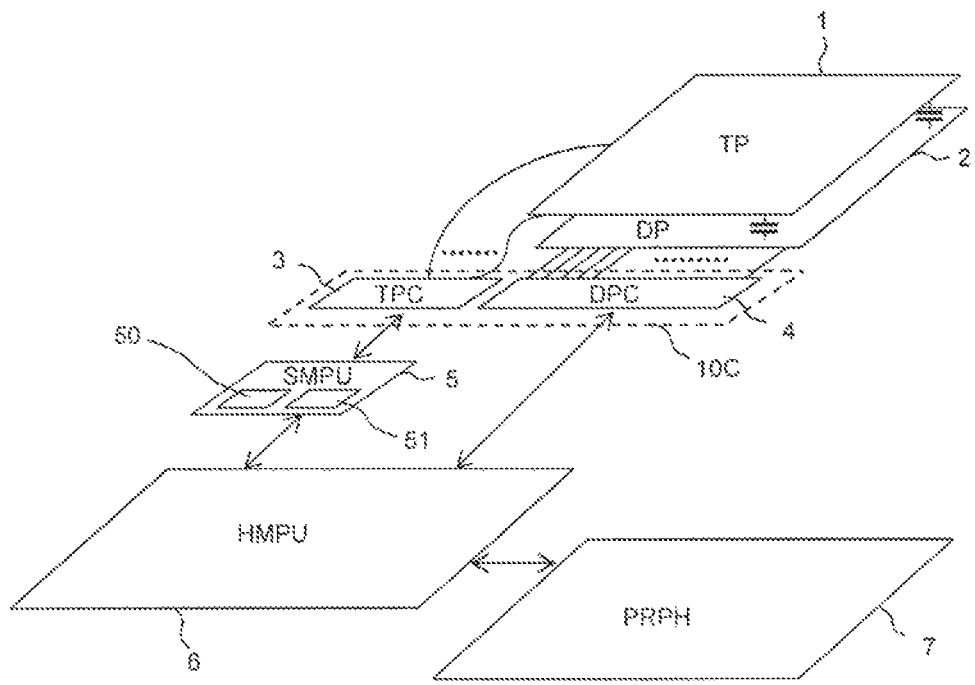
FIG. 14 is a block diagram schematically showing, by example, a portable information terminal device having a semiconductor device in a semiconductor chip including a touch panel controller and a display controller formed therein.

The portable information terminal device shown in FIG. 12 has a touch panel (TP)1, a display panel (DP)2, a touch panel controller (TPC)3, a display controller (DPC) 4, a subprocessor (SMPU) 5, a host processor (HMPU) 6, and other peripherals (PRPH) 7; the touch panel controller 3, the display controller 4, and the subprocessor 5 described here are integrated into a one-chip semiconductor device 10A formed in a semiconductor chip according to e.g. CMOS integrated circuit manufacturing techniques. Also, the portable information terminal device may be arranged so that the touch panel controller 3 and the subprocessor 5 are integrated into a semiconductor device 10B formed in a semiconductor chip, and the display controller 4 is formed in another chip as in the example shown in FIG. 13. The arrangement like this has the advantage that even in case that the display controller 4 is changed in its specification with the specification of touch panel detection left unchanged, a touch panel system according to new specifications can be readily arranged by replacing the one-chip display controller 4 with an alternative. The semiconductor device 10B receives synchronizing signals for display, such as Hsync and Vsync from the display controller 4. Otherwise, the portable information terminal device may be arranged so that the touch panel controller 3 and the display controller 4 are integrated into a semiconductor device 10C formed in a semiconductor chip, and the subprocessor 5 is formed in another chip as in the example shown in FIG. 14. The arrangement like this is suitable for diverting a software program built on the subprocessor 5 to design products of more than one generation. In other words, the functions of the semiconductor device can be divided so that the hardware designs for liquid crystal display and touch detection, and the software design by use of results of touch detection can be developed separately. Although not shown in any diagrams particularly, this does not interfere with forming the touch panel controller 3, the display controller 4, and the subprocessor 5 in different semiconductor chips respectively.

For instance, the display panel 2 has a glass substrate, and transparent electrodes and liquid crystal pixels which are formed on the glass substrate according to the scale of display. In the non-limiting example shown here, the touch panel 1 is arranged as a so-called mutual capacitance type touch panel, and it has an in-cell structure in which the touch panel is integrally formed with and on a surface of the display panel, and drive electrodes (Y-electrodes) and detection electrodes (X-electrodes) are arranged through a dielectric to intersect with one another.

The touch panel controller 3 (i.e., a capacitive sensing controller) periodically integrates signals arising on the detection electrodes through capacitance components between drive electrodes and detection electrodes (e.g., sensor electrodes) of the touch panel 1 by supplying drive pulses to drive electrodes sequentially to create detection data according to the capacitance components.

The subprocessor 5 for may set the initial setting of the touch panel controller 3, and controls the action mode thereof. Also, the subprocessor 5 performs, based on detection data taken by the touch panel controller 3, a calculation of a touch position that a finger has been brought close to, an evaluation of extraneous noise, etc. The subprocessor 5 is an example of the data processor. The subprocessor 5 and the host processor 6 are each a program processing unit including a central processing unit (CPU) and a peripheral circuit thereof.

In this embodiment, the host processor 6 has the whole control of the portable information terminal device. For instance, in case that the host processor 6 creates display data in a step forming a part of display control, the display controller 4 receives the display data, and supplies the display panel 2 with display signals according to the display data while synchronizing a display timing. In addition, the host processor 6 receives position coordinates calculated by the subprocessor 5, analyses an operation on the touch panel 1 from relations between details of display at that time and the position coordinates, and performs control in response to the input.

The other peripheral circuits 7 include a communication control unit, which may be essential to a portable information terminal device, an image-processing unit, an audio-processing unit, and other accelerators including one for data processing.

Figure 15:
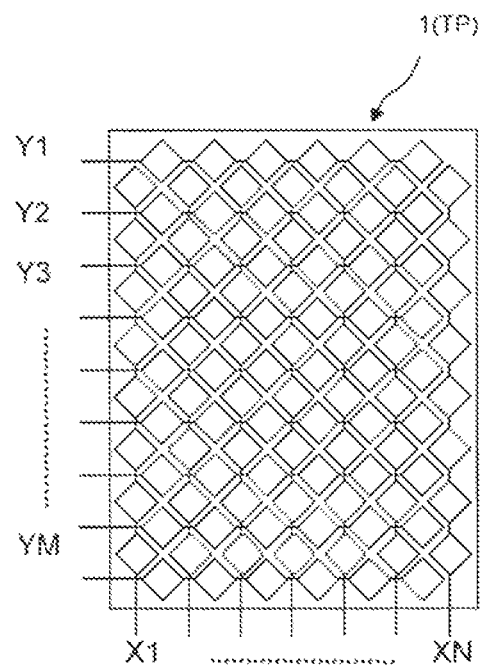
FIG. 15 is an explanatory diagram showing, by example, the arrangement of electrodes of a touch panel.

FIG. 15 shows, by example, the arrangement of electrodes of the touch panel 1. The touch panel 1 has a large number of drive electrodes (Y-electrodes) Y1 to YM formed in a crosswise direction and a large number of detection electrodes (X-electrodes) X1 to XN formed in a lengthwise direction; the drive and detection electrodes are arranged so as to be electrically insulated from one another. Each electrode is shaped to have square electrode parts along its extending direction at intervals; a node capacitance is formed between adjacent square electrode parts electrically insulated from each other. In case that an object such as a finger in conduction with the global ground is brought close to such a node capacitance, a stray capacitance resulting from the object is added to the node capacitance, and thus a capacitance component (combined capacitance component) between the electrodes involved with the approach of the object is made smaller than the node capacitance. In detection data generated by the touch panel controller 3, signal differences arise according to the differences of such capacitance components.

Figure 16:
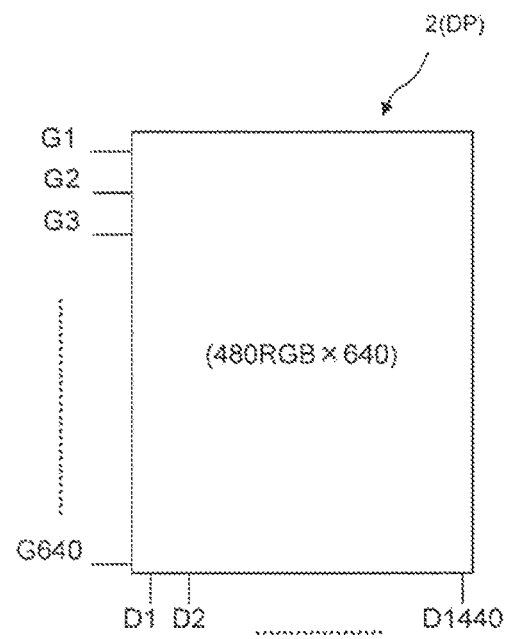
FIG. 16 is an explanatory diagram showing, by example, the arrangement of electrodes of a display panel.

FIG. 16 shows, by example, the arrangement of electrodes of the display panel 2. The display size of the display panel 2 shown in the diagram is of a color display scale of 480 RGB×640, for example. The display panel 2 has, thereon, gate electrodes G1 to G640 serving as scan electrodes and extend along the horizontal direction, and drain electrodes D1 to D1440 serving as signal electrodes and extend along in the vertical direction; many display cells (sub-pixels) having select terminals connected with corresponding scan electrodes, and input terminals connected with corresponding signal electrodes are arranged on their intersection portions. For instance, the display controller controls the sequential driving of gate electrodes G1 to G640 (scan driving of the display lines) during a one-frame display period defined by vertical synchronizing signals, and provides gradation signals (display signals) to the drain electrodes D1 to D1440 for driving each gate electrode, thereby controlling liquid crystal elements of the sub-pixels in transmittance in units of display lines.

Figure 17:
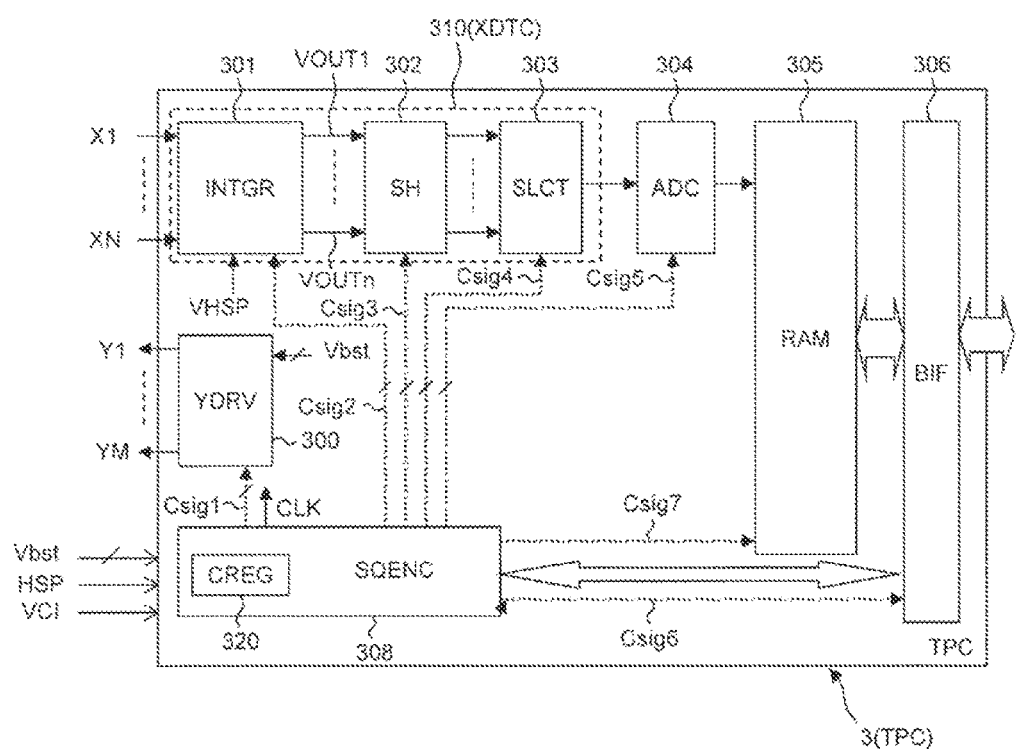
FIG. 17 is a block diagram showing, by example, the whole configuration of the touch panel controller.

FIG. 17 shows, by example, the whole configuration of the touch panel controller 3. The touch panel controller 3 has: a drive circuit (YDRV) 300; a detection circuit (XDTC) 310; an AD conversion circuit (ADC) 304; a RAM 305; a bus interface circuit (BIF) 306; and a sequence control circuit (SQENC) 308 as a control circuit. The detection circuit 310 includes e.g. an integration circuit (INTGR) 301, a sample hold circuit (SH) 302, and a selector (SLCT) 303. Here, a circuit for calibration on the detection circuit 310 is not shown in the diagram.

The drive circuit 300 repeats, with a given timing, the action of sequentially outputting drive pulses to the Y-electrodes Y1 to YM for touch detection. The drive pulse is output more than once for each Y-electrode. At this time, the drive pulses produce signals on the X-electrodes X1 to XN through the capacitance components according to the timing which is determined by its pulse cycle and pulse width. The integration circuit 301 is a circuit operable to integrate signals thus produced. Because periodic extraneous noise is accumulated in the same way owing to the integrating action, the integration circuit is arranged to be able to decide the pulse cycle of a drive pulse as described above and the pulse width thereof. The detail of it will be described later.

The signals VOUT1 to VOUTN subjected to integration by the integration circuit 301 are held by the sample hold circuit 302 for each of the X-electrodes X1 to XN. From the signals thus held, a selection is made by e.g. the selector 303. Then, the selected signals, which are analog signals, are converted into digital signals by the AD conversion circuit 304, and the digital signals form detection data. The converted detection data are accumulated in RAM 305. The detection data accumulated in RAM 305 are supplied to the subprocessor 5 through the bus interface circuit 306, and then used in a digital filter calculation and a coordinate calculation.

The sequence control circuit 308 uses control signals Csig1 to Csig6 to control the drive circuit 300, the integration circuit 301, the sample hold circuit 302, the selector 303, the AD conversion circuit 304 and the bus interface circuit 306 in their actions, and controls the access to RAM 305 by means of the control signal Csig7. In one non-limiting example, the pulse voltage Vbst of drive pulses which the drive circuit 300 outputs to the Y-electrodes, the X-electrodes' initialization voltage VHSP input to the integration circuit 301, and a source voltage VIC other than those voltages are supplied from outside the touch panel controller 3.

Figure 18:
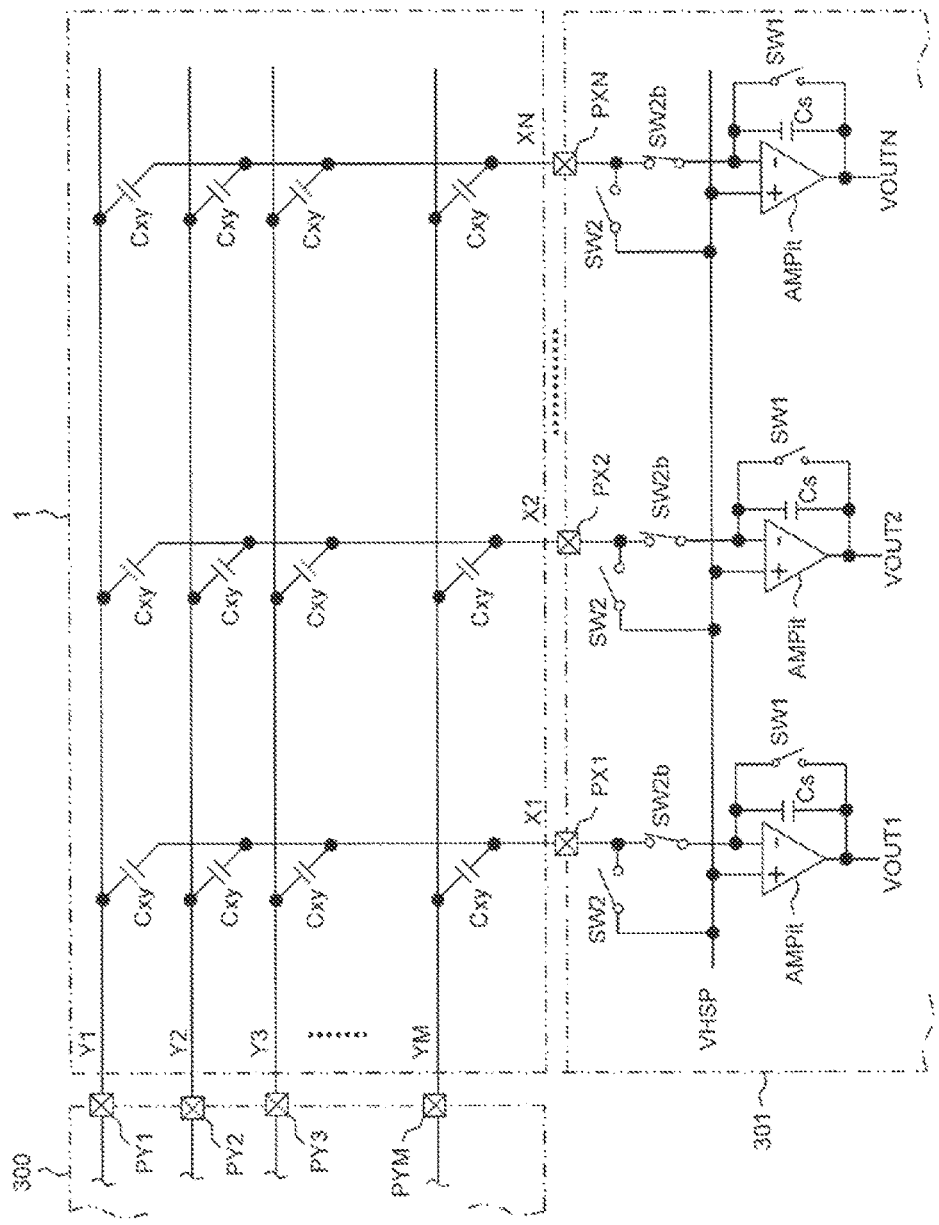
FIG. 18 is a circuit diagram showing the equivalent circuit of the touch panel and an example of the integration circuit.

FIG. 18 shows the equivalent circuit of the touch panel 1, and an example of the integration circuit 301. The touch panel 1 has Y-electrodes Y1 to YM and X-electrodes X1 to XN which are arranged like a matrix; node capacitances formed on their intersecting portions are denoted by the symbol Cxy in the diagram.

The integration circuit 301 includes e.g. switches SW2 for selectively applying a voltage VHSP to the X-electrodes X1 to XN as a precharge voltage to precharge the X-electrodes X1 to XN, operational amplifiers AMPit each having a non-inverting input terminal (+) to which the voltage VHSP is applied as a reference voltage, switches SW2b for selectively connecting the inverting input terminals (−) of the operational amplifiers AMPit with the corresponding X-electrodes, integrating capacitors Cs each disposed between the inverting input terminal (−) and output terminal of the corresponding operational amplifier AMPit, and switches SW1 for resetting the integrating capacitors Cs; each switch SW1 serves to reset an electric charge accumulated by the corresponding capacitor Cs used for detection. Although no special restriction is intended, each switch SW2 is put in OFF state during a pulse-drive period of the corresponding Y-electrodes Y1 to YM, and the switches SW2 and SW2b are controlled in switching in a complementary manner. The drive terminals PY1 to PYM are drive terminals of the drive circuit 300 connected with the drive electrodes Y1 to YM. The detection terminals PX1 to PXN are detection terminals of the integration circuit 301 connected with the detection electrodes X1 to XN.

Figure 19:
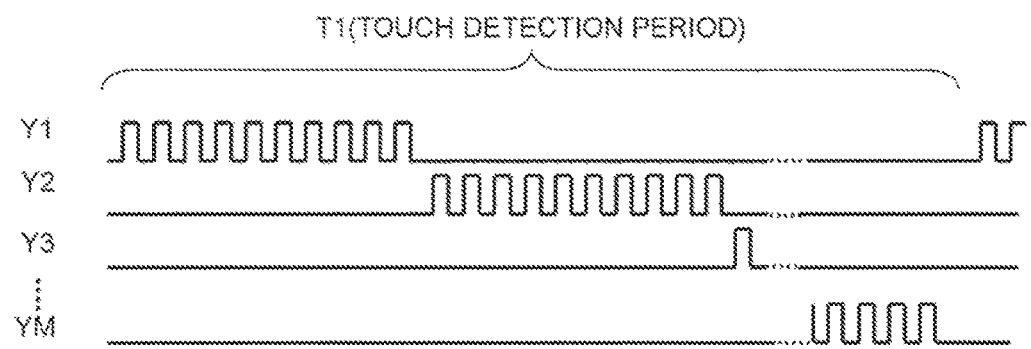
FIG. 19 is a waveform diagram showing examples of signal waveforms of drive pulse signals supplied to Y-electrodes Y1 to YM.

FIG. 19 shows examples of signal waveforms of drive pulse signals supplied to the Y-electrodes Y1 to YM. For instance, the Y-electrodes Y1 to YM are supplied with drive pulses in the order of the electrodes arrayed. For the sake of simplicity, the diagram shows an embodiment in which e.g. 10 drive pulses having a predetermined pulse width and a predetermined pulse cycle are supplied to each Y-electrode. Periods during which one Y-electrode is driven by pulse more than once correspond to periods (display-scan periods) during which display lines of the display panel are scan-driven sequentially. For instance, supposing one Y-electrode is pulse-driven 10 times in the case of pulse-driving the Y-electrodes of the touch panel twice during one display scan period synchronized with horizontal synchronization signals of the display panel, one Y-electrode is pulse-driven 10 times to perform the integrating action during a display period of 5 display lines. The detection sensitivity can be increased by the integrating action by means of pulse-driving more than once. Now, T1 represents a period of one touch detection on the whole face of the touch panel.

Figure 8:
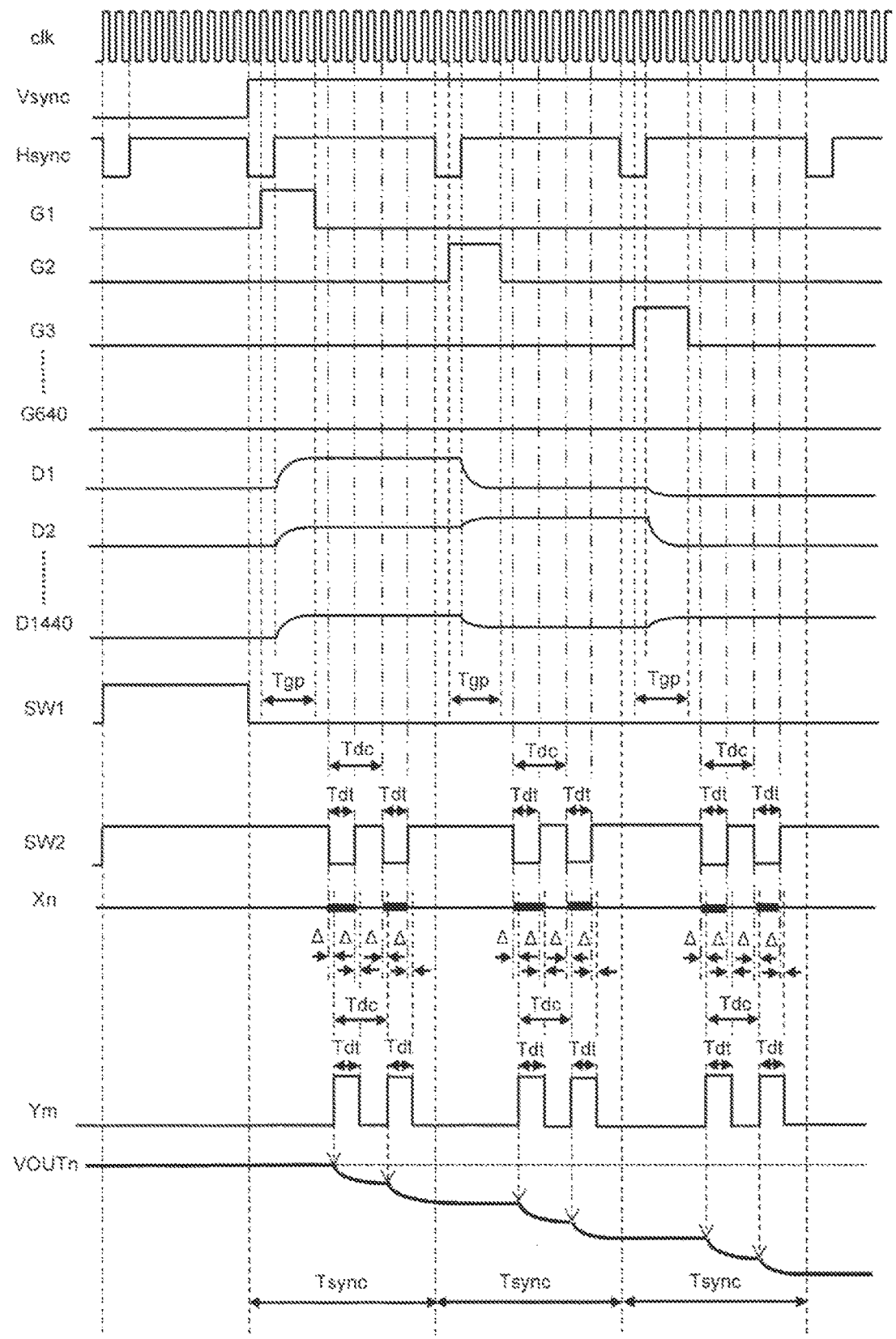
FIG. 8 is a timing diagram showing an example of the action timing of normal scan.

FIG. 8 shows, by example, the action timing of touch detection as an example of the integrating action by the integration circuit 301. Referring to FIG. 8, Vsync represents a vertical synchronizing signal of the display panel 2, Hsync represents a horizontal synchronization signal, and clk represents an action reference clock for the touch panel controller 3 and the display controller 4. Here, a horizontal synchronization period Tsync defined by a horizontal synchronization signal Hsync is an embodiment of the display-scan cycle. The integrating action of producing detection signals VOUT1 to VOUTN in the integration circuit 301 is repeated in each of a predetermined number of horizontal synchronization periods Tsync. First in each integrating action, the switches SW1 and SW2 are turned ON, whereby the X-electrode Xn (n=1, . . . , N) is precharged by the voltage VHSP, and the electric charge of the corresponding capacitor Cs is reset. In each horizontal synchronization period Tsync subsequent to it, the Y-electrode Ym (m=1, . . . , M) is pulse-driven twice for each electrode with a timing changed from the timing of the change of pulses to the gate electrodes G1 to G640 in a pulse-drive period (Tgp). At the time of pulse-driving the Y-electrode Ym, the corresponding switch SW2 is turned OFF, and the switch SW2b is turned ON. In case that a drive pulse (the pulse voltage is denoted by Vy) is input to the Y-electrode Ym with the corresponding switches SW1 and SW2 in OFF state and the switch SW2b in ON state, electric charge (=Vy×Cxy) is caused to move to each X-electrode Xn through the node capacitances Cxy on the Y-electrode Ym, the output voltage VOUTn of the corresponding operational amplifier AMPit receiving the electric charge through its inverting input terminal (−) is decreased by a voltage corresponding to the moved electric charge. If a finger is put near the node capacitance Cxy, the capacitance value of the node capacitance Cxy is decreased by a stray capacitance caused by the finger. In case that the combined capacitance is decreased by a capacitance value Cf owing to the approach of e.g. a finger, an electric charge input to the operational amplifier AMPit of the X-electrode Xn is given by Vy×(Cxy−Cf). Therefore, the drop in the level of the output VOUTn of the operational amplifier AMPit with a finger in touch with the touch panel is smaller than the drop in the level when nothing is in touch therewith. The output signal VOUTn is converted into detection data of a digital value by the AD conversion circuit 304, which will be used for e.g. a coordinate calculation conducted by the subprocessor 5.

AC Charger Noise

Figure 20:
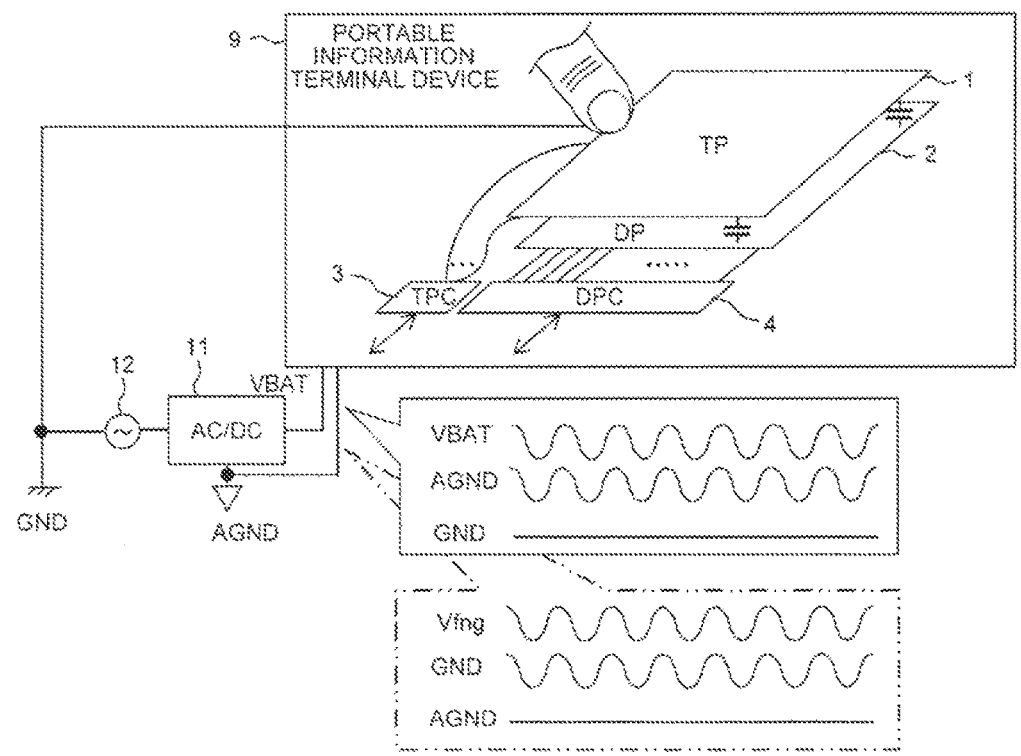
FIG. 20 is an explanatory diagram schematically showing the state of a power source of the portable information terminal device when it is being charged.

As periodic extraneous noise, AC charger noise will be described. FIG. 20 schematically shows the state of a power source of the portable information terminal device which it is being charged. In the portable information terminal device 9 with the touch panel 1 incorporated therein, an AC charger (AC adapter) 11 is used to charge a battery. The AC charger 11, namely AC/DC converter converts e.g. a commercial power source 12 of AC 100V into a DC voltage VBAT of the battery of the portable information terminal device 9. Herein, GND denotes the ground (global ground) to the mother earth, and AGND denotes a ground (terminal ground as a local ground) of the portable information terminal device. In the portable information terminal device 9, the ground GND to the mother earth is separated from each terminal ground AGND. The AC charger 11 has therein many parts whose output voltage VBAT sways together with the terminal ground voltage AGND at a predetermined frequency. Specifically, the DC voltage VBAT appears to fluctuate with respect to the ground GND to the mother earth on the side of the portable information terminal device 9. The width of the fluctuation varies according to the type of the AC charger 11, and also to the state of charge of the battery. For instance, the frequency appears to fluctuate in a range of 1 to 500 kHz approximately. The fluctuation frequency of the DC voltage VBAT largely depends on the action frequency of the AC/DC regulator which the AC charger 11 includes. It has been known that the action frequency of the regulator may fluctuate depending on the remaining amount of the battery included in the portable information terminal device 9.

FIG. 20 shows the relation between the ground GND to the mother earth with respect to the terminal ground AGND, and the surface potential Vfng of a touch portion where a finger is in touch with the touch panel 1. As is clear from the description above, the surface potential Vfng appears to fluctuate with respect to the terminal ground AGND at 1 to 500 kHz approximately.

Figure 21:
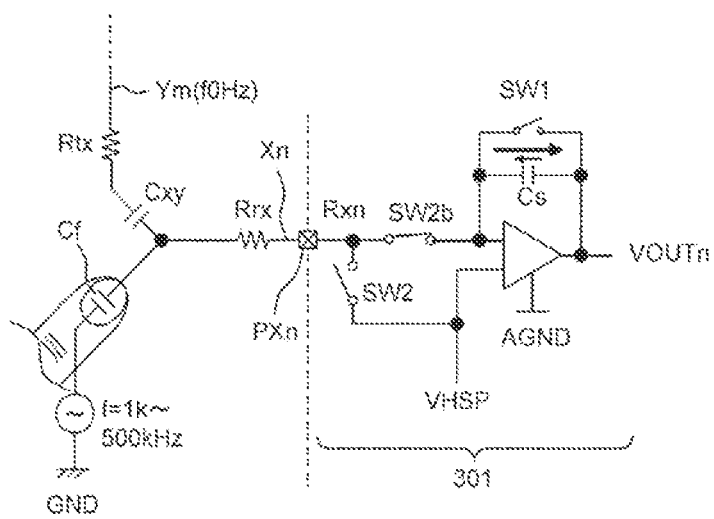
FIG. 21 is a circuit diagram showing, by example, the relation of electrical connection on a touch portion where a finger is in touch with the touch panel.

FIG. 21 shows, by example, the relation of electrical connection on a touch portion where a finger is in touch with the touch panel 1. Rtx denotes a resistance load of the Y-electrode Ym of the touch panel 1; Rrx denotes a resistance load of the X-electrode Xn of the touch panel 1; and Cxy denotes a mutual capacitance of the touch panel 1. Shown in the diagram is an example of the detection circuit arranged on the assumption that the integration circuit 301 is provided on the right side of the broken line. On the detection circuit having the X-electrode Xn connected therewith, the detecting action is realized by controlling a group of switches SW1, SW2, SW2b. In the actual detecting action, rectangular pulses having a frequency f0 are input to the Y-electrode Ym, and the switches SW1, SW2, SW2b are controlled in synchronization with the changes of the rectangular pulses as described with reference to FIG. 8. On the other hand, the surface potential Vfng is applied to e.g. the X-electrode Xn through a stray capacitance Cf caused by a finger. The surface potential Vfng is noise (AC charger noise) of about 1 to 500 kHz generated attributed to the AC charger 11 connected thereto, and is input to the integration circuit 301 through the X-electrode Xn. The surface potential Vfng is also referred to as "AC charger noise" below.

Figure 22:
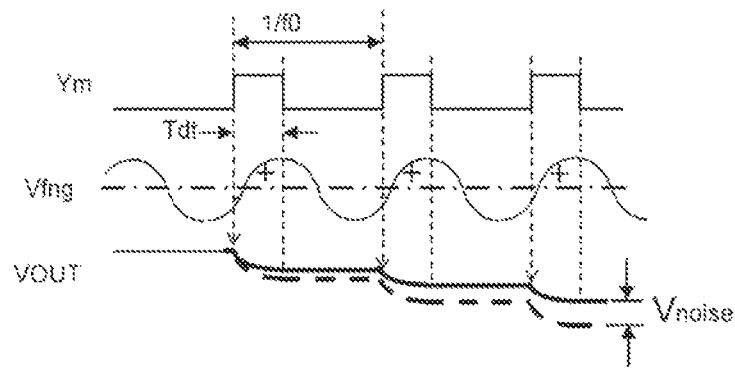
FIG. 22 is a waveform diagram showing, by example, the influence of AC charger noise Vfng on the integrating action.

FIG. 22 shows, by example, the influence of the AC charger noise Vfng on the integrating action. If the frequency f of AC charger noise Vfng is coincident with the frequency f0 of drive pulses applied to the Y-electrode Ym, and further coincident with a frequency of an integer multiple of the frequency f0, noise components superposed on detection signals VOUTn produced by the integrating action of the integration circuit 301 become larger. In FIG. 22, the pulse width Tdt of such drive pulse is regarded as a detection period, but AC charger noise Vfng is added up during the detection period Tdt. The diagram shows positive components of AC charger noise Vfng above the center line (single dot and dash line) of the AC charger noise Vfng, and negative components of the AC charger noise Vfng below the center line. The AC charger noise is added up each time a drive pulse is applied and therefore, a result of the addition is observed as noise on an output VOUTn of the integration circuit 301. Specifically, in FIG. 22, the detection signal VOUTn when the frequency f of AC charger noise Vfng is equal to the frequency f0 of drive pulses is shown by a broken line. The potential arising on the X-electrode Xn is accumulated in each period and becomes larger than the detection signal with no AC charger noise, which is drawn by a solid line. As a result, the influence of AC charger noise Vfng as a difference voltage Vnoise arises on detection signals VOUTn. The same is true in case of the frequency f of AC charger noise Vfng which is an integer multiple of the frequency f0 of drive pulses.

Incidentally, in case that the frequency f of AC charger noise Vfng is not substantially coincident with the frequency f0 of drive pulses or a frequency which is an integer multiple thereof, the influence of AC charger noise Vfng will be lessened thanks to the averaging effect of the detecting action by inputting drive pulses more than once.

Measure Against AC Charger Noise by Use of a Detection Period

As is clear from the above, extraneous noise such as AC charger noise which decreases the accuracy of touch detection is noise which is synchronized to a display-scan cycle Tsync as a horizontal synchronization period while it is also noise (Tnr=Tsync/m) having a cycle of 1/m (m is a positive integer) of the display-scan cycle Tsync. The extraneous noise is typified by the AC charger noise Vfng.

A technique used to mitigate AC charger noise by use of a detection period has been already proposed in the related art (Japanese Patent Application No. 2012-216745). In the technique described there, the pulse width of drive pulses to the drive electrode Ym, namely the detection period Tdt is made coincident with or brought close to the period of an integer multiple of the cycle Tnr of extraneous noise NR, which is 1/m of the display-scan cycle Tsync, as shown with reference to FIG. 5, by example. Describing with a mathematical expression, the detection period Tdt is set so as to meet or nearly satisfy the condition given by Tdt=Tsync× n/m=Tnr×n. As a matter of course, it is predicated on Tdt<Tsync.

Figure 5:
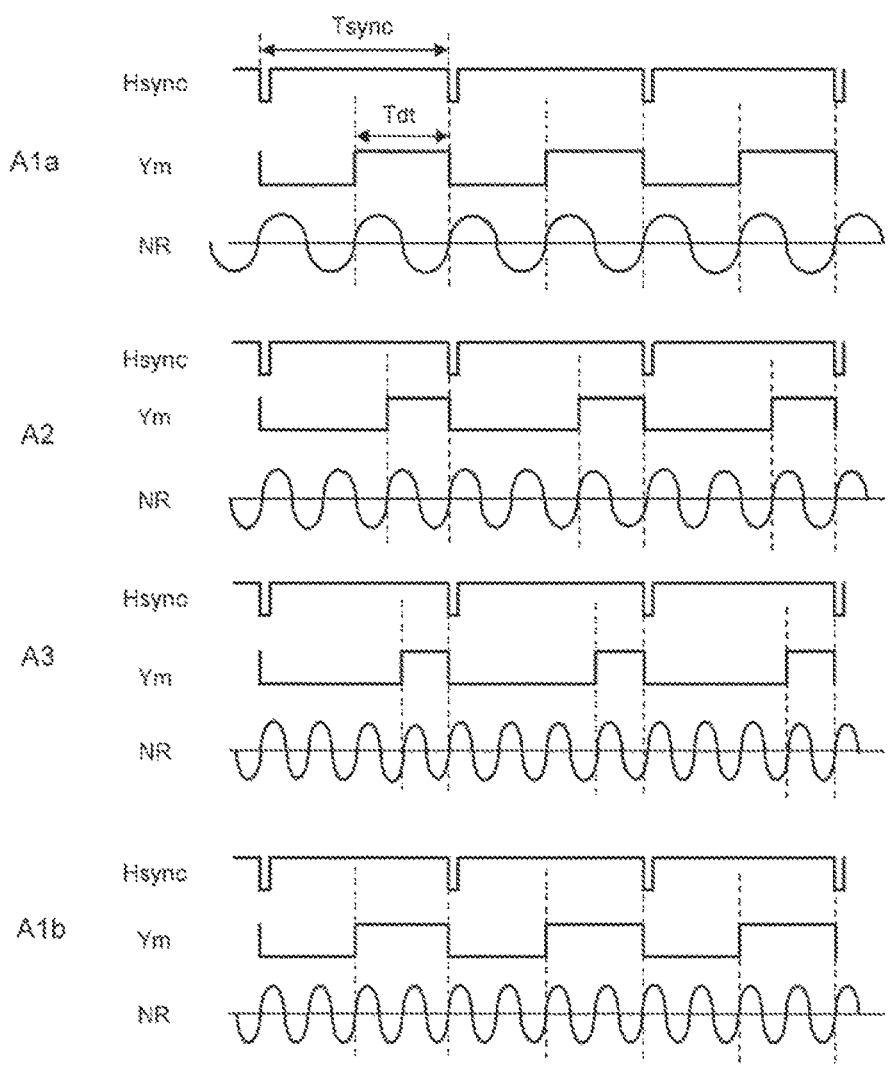
FIG. 5 is a waveform diagram showing, by example, a measure against AC charger noise by use of a detection period.

As described above, display-synchronizing detection is performed where touch detection is performed in a period less than display panel drive noise and synchronized with the display-scan cycle Tsync. Performing the touch detection in synchronization with the display-scan cycle Tsync worsens the accuracy of the detection on condition that extraneous noise of a cycle in the relation Tsync/m is superposed on detection signals. The AC charger noise is a representative example of extraneous noise NR. FIG. 5 shows, by example, a setting of the detection period according to the cycle Tnr of extraneous noise NR. In such setting, the detection period Tdt is set to n times of a cycle (Tnr) of noise to be suppressed. Making adjustment like this, noise components in positive and negative directions will be added uniformly between the beginning and the end of the detection period Tdt inclusive and thus, the influence of the noise will be cancelled.

The first settings A1a and A1b of FIG. 5 show examples in which the influences of extraneous noise NR of frequencies of multiples of 2×fs can be curbed provided that the detection period is set as Tdt=½×Tsync, and fs=1/Tsync. In other words, the first setting form A1a is arranged so that the influence of extraneous noise NR of Tnr=Tsync×(½) can be curbed; the first setting form A1b is arranged so that the influence of extraneous noise NR of Tnr=Tsync×(¼) can be curbed.

The second setting A2 of FIG. 5 shows an example in which the influence of extraneous noise NR of frequencies of multiples of 3×fs can be curbed, provided that the detection period is adjusted to meet Tdt=(⅓)×Tsync. In this example, extraneous noise NR of a frequency of 3×fs is shown by example.

The third setting A3 of FIG. 5 shows an example in which the influence of extraneous noise NR of frequencies of multiples of 4×fs can be curbed provided that the detection period is adjusted to meet Tdt=(¼)×Tsync. In this example, extraneous noise NR of a frequency of 4×fs is shown by example.

Figure 6:
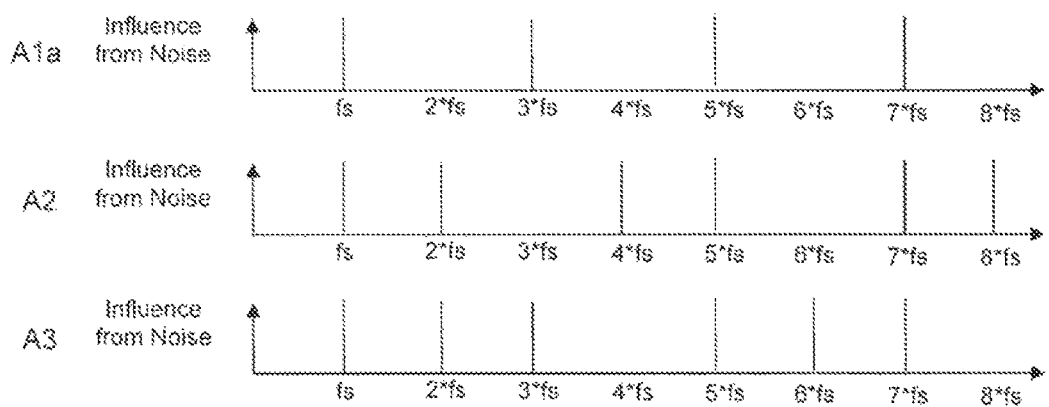
FIG. 6 is a characteristic diagram showing, by example, noise transmission properties with respect to noise frequencies (i.e. the horizontal axis) in the first to third setting forms A1a to A3 of FIG. 5.

FIG. 6 shows, by example, noise transmission properties with respect to noise frequencies (i.e. the horizontal axis) in the first to third settings A1a to A3. In the examples, fs=1/Tsync; the vertical axis schematically shows the influence of noise on results of the detection, and frequencies influenced by the noise are shown by vertical lines. This means that the influence of noise is cancelled as long as the detection period Tdt is an integer multiple of the cycle Tnr of extraneous noise NR which is 1/m of the display-scan cycle Tsync. The first setting form A1a shows that the influences of extraneous noise NR having frequencies of integer multiples of a frequency of 2×fs, namely frequencies 2×fs, 4×fs, 6×fs, 8×fs, and so on can be curbed in regard to the detection period Tdt set to ½×Tsync. The second setting form A2 shows that the influences of extraneous noise NR having frequencies of integer multiples of 3×fs, namely frequencies 3×fs, 6×fs, and so on can be curbed in regard to the detection period Tdt set to ⅓×Tsync. The third setting form A3 shows that the influences of extraneous noise NR having frequencies of integer multiples of 4×fs, namely frequencies 4×fs, 8×fs, and so on can be curbed in regard to the detection period Tdt set to ¼×Tsync. However, with the measure against AC charger noise by use of the detection period Tdt, it is difficult to curb noise NR having a long cycle. Specifically, in the case of making each detection period Tdt in the periodic integrating action coincident with the cycle of extraneous noise, or an integer multiple thereof, the detection period Tdt needs to be made longer in order to cope with extraneous noise NR of a longer cycle, the time of occurrence of display action noise during a display period more likely falls in the detection period Tdt, and thus it becomes difficult to avoid the drop in sensitivity of touch detection. Especially, there is the tendency that higher definition display shortens the display-scan cycle Tsync and as such, it becomes more difficult to curb noise NR having a longer cycle.

Measure Against AC Charger Noise by Use of a Detection Cycle

Next, a method for curbing noise of a particular cycle by adjustment of a detection cycle Tdc (e.g., the time between the beginning of consecutive detection periods Tdt) will be described. The method is arranged to solve the problem that it is difficult to mitigate the influence of extraneous noise having a longer cycle even after the duration of the detection period Tdt is adjusted to be an integer multiple of the cycle Tnr of extraneous noise NR.

To reduce AC charger noise by adjusting a duration of the detection cycles, the pulse cycle of drive pulses to the drive electrode Ym, namely the detection cycle Tdc is set to be coincident with or brought close to a cycle that has a duration of an odd multiple of a half of the cycle period of extraneous noise NR, which is 1/m of the display-scan cycle Tsync, as shown by example in FIG. 1. Describing with a mathematical expression, the detection cycle Tdc is set so as to meet or nearly satisfy the condition given by Tdc=Tsync× (2×n−1)/(m×2) (where n and m are a positive integers). As a matter of course, it is predicated on Tdc<Tsync.

FIG. 1 shows, by example, settings of the detection cycle Tdc according to the cycle Tnr of extraneous noise NR. Specifically, the detection cycle Tdc is set to an odd multiple of a half of a noise cycle (Tnr) to be curbed. By making adjustment of the detection cycle in this way, it becomes possible to invert the polarity of extraneous noise NR in each detection cycle. Therefore, it becomes possible to cancel the influence of extraneous noise in groups of two detection periods in the detection cycle. In other words, the noise influences which are different from each other by just a half of the phase of the noise cycle Tnr are captured in two consecutive detection periods, whereby the noise influences are cancelled.

The first setting form B1 of FIG. 1 shows one example in which the influence of extraneous noise NR of a frequency of an odd multiple of fs can be curbed provided that the detection cycle is adjusted to meet Tdc=(½)×Tsync, and fs=1/Tsync. That is, the first setting B1 is arranged to be able to curb the influence of extraneous noise NR which meets Tnr=T sync.

The second settings B2a and B2b of FIG. 1 are arranged to be able to curb the influence of extraneous noise of a frequency of an odd multiple of 2×fs, provided that the detection cycle is adjusted to meet Tdc=(¼)×Tsync. That is, the second setting B2a is arranged to be able to curb the influence of extraneous noise NR which meets Tnr=Tsync× (½). The second setting B2b is arranged to be able to curb the influence of extraneous noise NR which meets Tnr=Tsync×(⅙).

The third setting B3 of FIG. 1 is arranged to be able to curb the influence of extraneous noise of a frequency of an odd multiple of 3×fs, provided that the detection cycle is adjusted to meet Tdc=(⅙)×Tsync.

Figure 2:
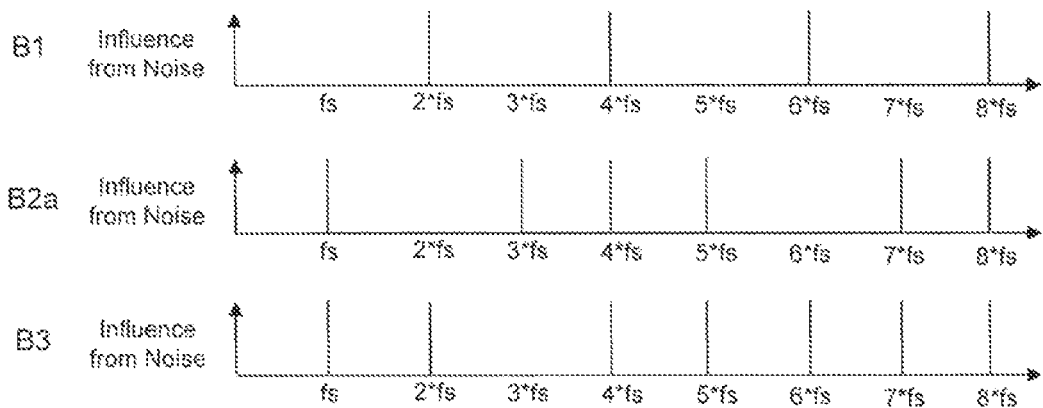
FIG. 2 is a characteristic diagram showing, by example, noise transmission properties with respect to noise frequencies (i.e. the horizontal axis) in the first to third setting forms B1, B2a, and B3 of FIG. 1.

FIG. 2 shows, by example, noise transmission properties with respect to noise frequencies (i.e. the horizontal axis) in the first to third setting forms B1, B2a and B3. In the examples, fs=1/Tsync; the vertical axis schematically shows the influence of noise on results of the detection; and frequencies influenced by the noise are shown by vertical lines. This means that the influence of noise is cancelled as long as the detection cycle Tdc is equal to an odd multiple of a half of the cycle of extraneous noise NR which is 1/m of the display-scan cycle Tsync.

The first setting B1 shows that the influences of extraneous noise NR having frequencies of odd multiples of a frequency fs, namely frequencies fs, 3×fs, 5×fs, 7×fs, and so on can be curbed in regard to the detection cycle Tdc set to ½×Tsync. The second setting B2a shows that the influences of extraneous noise NR having frequencies of odd multiples of a frequency of 2×fs, namely frequencies 2×fs, 6×fs, and so on can be curbed in regard to the detection cycle Tdc set to ¼×Tsync. The third setting B3 shows that the influences of extraneous noise NR having frequencies of odd multiples of a frequency of 3×fs, namely frequencies 3×fs, 9×fs, and so on can be curbed in regard to the detection cycle Tdc set to ⅙×Tsync.

According to the method for adjusting the detection cycle Tdc as described above, it is required to set Tdt=(½)×Tsync in the adjustment method by use of the detection period Tdt of FIG. 5 when curbing extraneous noise of 2×fs, for example (the first setting A1a of FIGS. 5 and 6). In contrast, with the method for setting the detection cycle Tdc, Tdc= (¼)×Tsync (the second setting form B2a of FIGS. 1 and 2) is set, which makes possible to curb extraneous noise that is shorter than the period of the detecting action (e.g., the detection period). Particularly, higher definition of a display panel may increase the time required for display within a one-frame period, and decrease the time which can be used for the action of touch detection. On this account, it becomes necessary to mitigate extraneous noise when the period or duration of the detecting action (or period) is decreased. Therefore, even when the display-scan cycle and the touch detection period are shortened, preventing the accuracy of touch detection from being decreased can be achieved even with extraneous noise NR having a cycle longer than the touch detection period (Tdt).

Measure Against AC Charger Noise by Use of Both of a Detection Period and a Detection Cycle Adjustment can be performed by use of both of a detection cycle and a detection period as a measure against extraneous noise. Noises of more frequencies can be curbed by setting the detection period Tdt and the detection cycle Tdc to particular values respectively.

Figure 3:
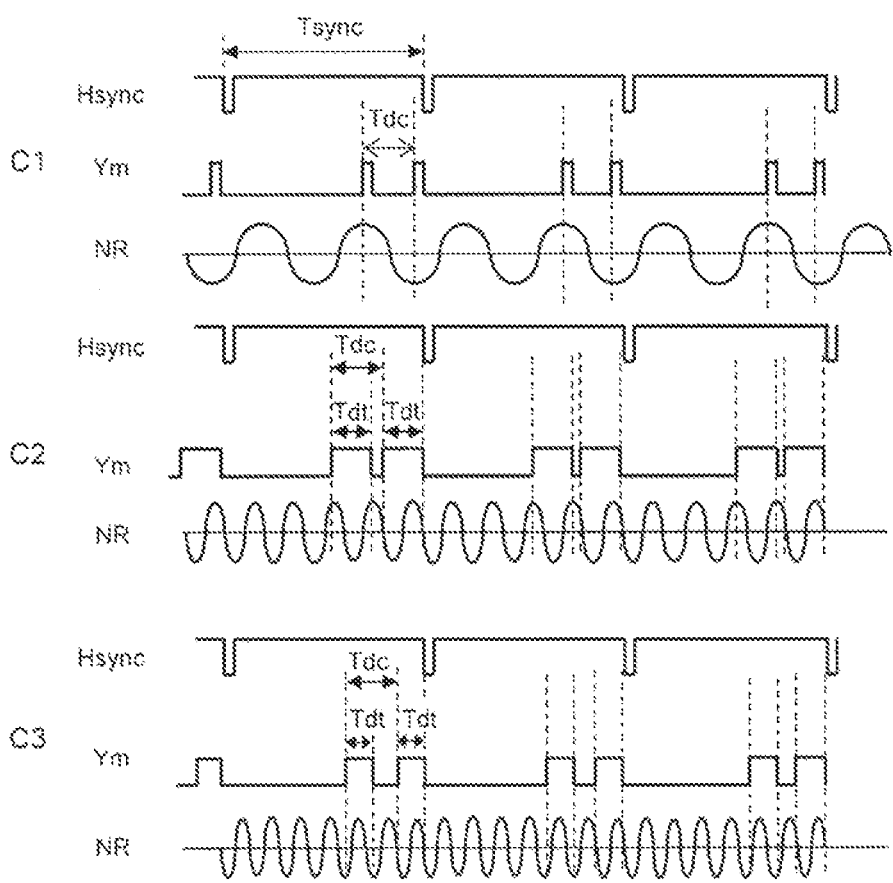
FIG. 3 is a waveform diagram showing, by example, forms for setting the detection cycle Tdc according to the cycle Tnr of extraneous noise NR.

FIG. 3 shows, by example, settings of the detection cycle Tdc according to the cycle Tnr of extraneous noise NR. In one example, the first setting C1 shows the same waveforms as those in the second setting B2a of FIG. 1. With this waveform, the detection cycle Tdc is adjusted to be (¼)× Tsync, and the influence of noise having a frequency of an odd multiple of 2×fs can be curbed. In this example, the detection period Tdt is shortened. The effect of curbing noise by use of the detection period Tdt ends up showing up on the extremely high frequency side.

In the second setting C2 of FIG. 3, the detection cycle Tdc is adjusted to be (¼)×Tsync as in the first setting C1 so that the influence of extraneous noise having a frequency of an odd multiple of 2×fs can be curbed. Additionally, the detection period Tdt is set to (⅕)×Tsync, and the influence of extraneous noise having a frequency of a multiple of 5×fs can be curbed.

In the third setting C3 of FIG. 3, the detection cycle Tdc is adjusted to be (¼)×Tsync as in the first setting C1 so that the influence of extraneous noise having a frequency of an odd multiple of 2×fs can be curbed. Additionally, the detection period Tdt is set to (⅐)×Tsync, and the influence of extraneous noise having a frequency of a multiple of 7×fs can be curbed.

Figure 4:
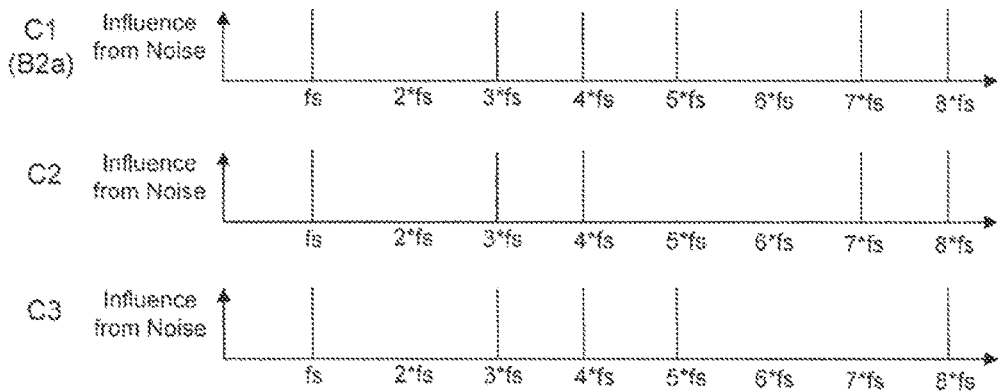
FIG. 4 is a characteristic diagram showing, by example, noise frequencies, which can be curbed by the setting forms of FIG. 3, by noise transmission properties with respect to noise frequencies (i.e. the horizontal axis)

FIG. 4 shows noise frequencies, which can be curbed by the settings of FIG. 3, by noise transmission properties with respect to noise frequencies (i.e. the horizontal axis). Unlike the properties shown in FIG. 2 in the case of setting only a detection cycle Tdc, and the properties shown in FIG. 6 in the case of setting only a detection period Tdt, extraneous noises of many cycles can be curbed with one setting, and therefore, a efficient technique against extraneous noise is enabled.

While the description has been presented focusing on a shorter cycle as a detection cycle in regard to FIGS. 1 and 3, the longer detection cycle is automatically decided based on the relation with the display-scan cycle Tsync. For instance, in the case of the second setting form 2Ba of FIG. 1, the shorter detection cycle is made (¼)×Tsync and therefore, and the longer detection cycle is (¾)×Tsync.

Setting of Detection-Period-Set Data and Detection-Cycle-Set Data

To drive the settings which have been described in connection with the measures against AC charger noise described above, the subprocessor 5 is arranged to include e.g. an electrically rewritable non-volatile memory, or e.g. a flash memory 50. In the flash memory 50, detection-cycle-set data and detection-period-set data which are used for the measures against charger noise may be stored in advance. The setting data may be stored previously when, e.g., designing the touch panel controller 3.

Figure 10:
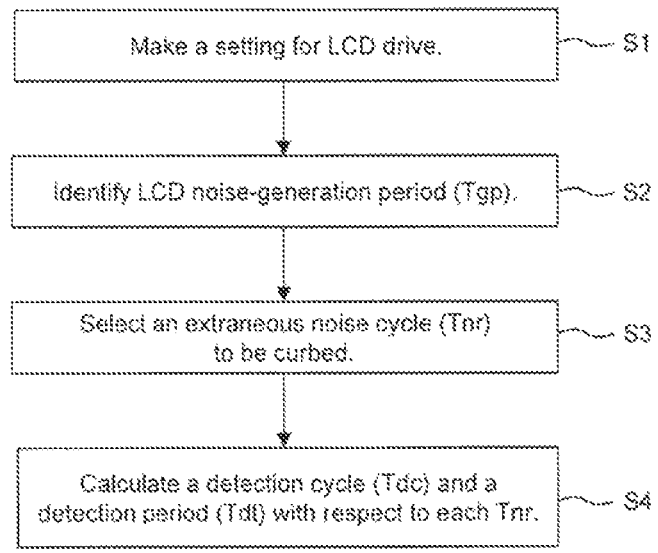
FIG. 10 is a flow diagram showing, by example, a procedure for designing detection-period-set data and detection-cycle-set data.

FIG. 10 shows, by example, a procedure for designing detection-period-set data and detection-cycle-set data. First, the display-scan cycle Tsync, which is one of conditions for driving the display panel 2 is determined from properties of the display panel 2 (S1). Next, a pulse-drive period (Tgp), which can be identified by the determined display-scan cycle Tsync, is identified (S2). In a pulse-drive period (Tgp), noises from the side of the display panel 2 come to the surface at rising and falling edges of pulses for scan driving the display panel as described based on FIG. 8.

Subsequently, the cycles (Tnr) of extraneous noises to be mitigated are selected from system requirements of the portable information terminal device (S3). The system requirements may factor in a particularly weak noise frequency, a particular frequency on which a measure against noise is taken by another circuit component such as a filter, and the like.

Then, detection cycles (Tdc) and detection periods (Tdt) with respect to individual extraneous noise cycles are calculated based on the conditions decided in the steps S1 to S3 (S4). The detection cycles (Tdc) and detection periods (Tdt) thus calculated are used as possible cycles and periods. The design procedure of FIG. 10 can be realized by use of a design support tool which is executed by a data processing unit such as an engineering workstation, for example.

The detection-cycle-set data for setting a detection cycle (Tdc) and detection-period-set data for setting a detection period (Tdt) thus calculated may be stored in a flash memory of the subprocessor 5 before shipment of a semiconductor device 10A, 10B, or 10C. When calculating expected frequencies of extraneous noise to mitigate, and a detection cycle and a detection period which make possible reduce the effects of the noise, the system may reference noise transmission properties with respect to noise frequencies which have been already described with reference to FIGS. 2 and 4 to estimate combinations which allow many kinds of noise frequencies to be curbed efficiently.

On a system with such a semiconductor device 10A, 10B, or 10C incorporated therein, such data is transmitted thereinside by CPU 51 of the subprocessor 5 from the flash memory 50 to a volatile memory inside the subprocessor 5, e.g. a work RAM of CPU 51 which is composed of a volatile memory such as SRAM at startup of the system, and then used.

It is not required that the detection-cycle-set data and detection-period-set data are previously stored in a flash memory before shipment of the semiconductor device 10A, 10B, or 10C. At the time of an initial action of the system, for example, the subprocessor 5 or the host processor 6 may dynamically calculate these data by means of a software program to measure them. "Dynamically" means that an optimum detection cycle and a detection period are decided by actually observing the influence of extraneous noise. As means for observing the influence of extraneous noise actually, noise detection scan to be described later may be diverted to perform the decision of a detection cycle and a detection period. Otherwise, the detection-cycle-set data and the detection-period-set data may be downloaded by use of a communication function of the portable information terminal device at the time of the initial action of the system. Further, with particularly large influence of extraneous noises, the subprocessor 5 can issue, to the display controller 4, an instruction to change a liquid crystal display driving condition such as a display-scan cycle Tsync, and then search for a suitable extraneous noise-curbing condition while changing the display-scan cycle Tsync. Further, in the case of searching for a suitable extraneous noise-curbing condition, the noise detection scan to be described later may be diverted for performing the search.

Touch Sequence for Coping with Extraneous Noises

Figure 7:
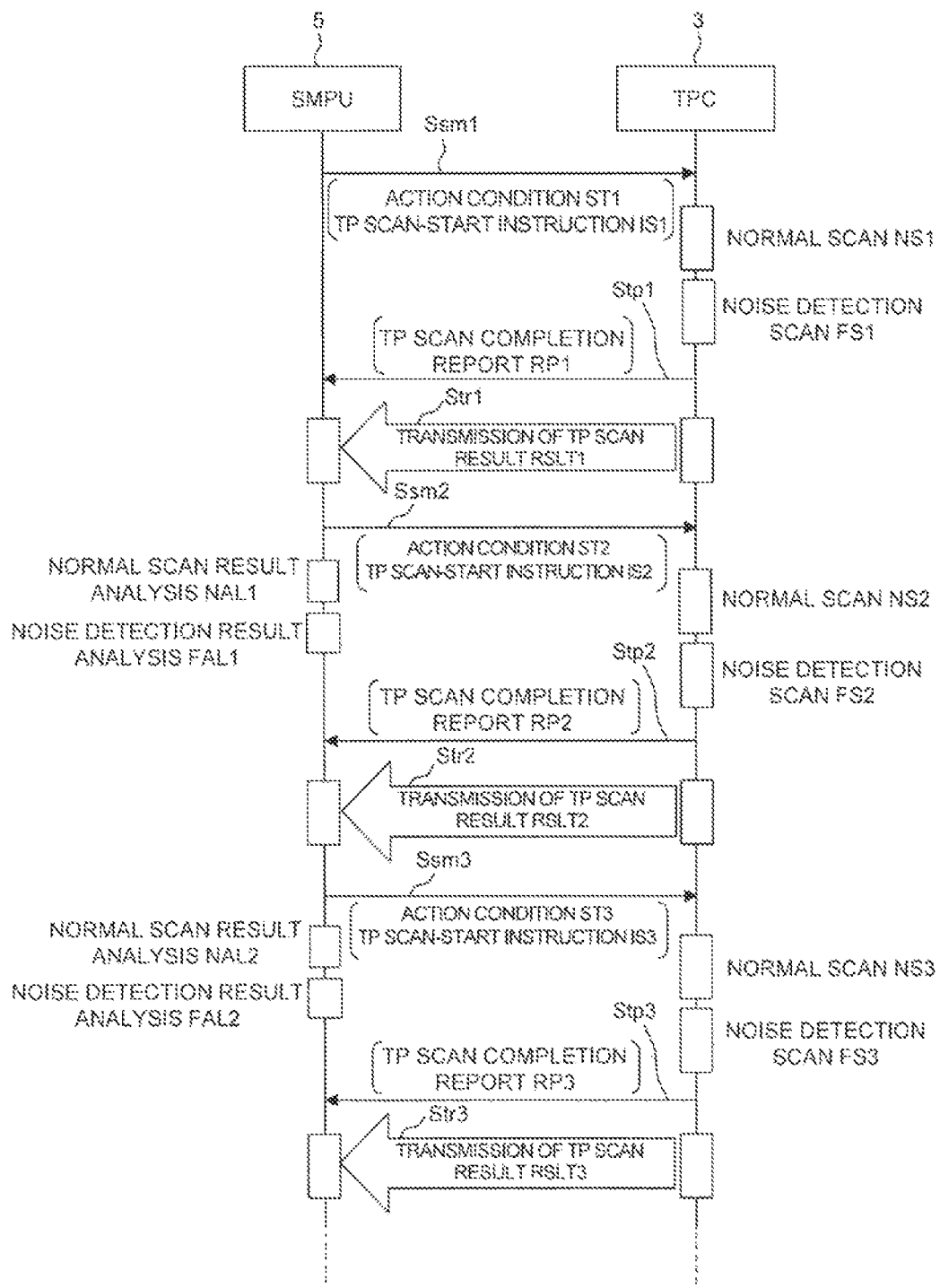
FIG. 7 is a flow diagram showing an example of a touch sequence for coping with extraneous noises.

FIG. 7 shows an example of a touch sequence for coping with extraneous noises. First, the subprocessor 5 loads the touch panel controller 3 with set data of a detection cycle Tdc and a detection period Tdt read from the flash memory 50 as touch detection conditions (working condition ST1), and further sends the touch panel controller 3 a touch-panel-scan-start instruction (TP scan-start instruction IS1) (Ssm1). The touch panel controller 3 having received the TP scan-start instruction IS1 performs a touch detection scan (also, hereinafter referred to as "normal scan") NS1 for touch detection. Further, the touch panel controller 3 performs a noise-detection scan FS1 for searching for a touch detection condition optimum for extraneous noise which the touch panel receives at that time. The normal scan NS1 and the noise-detection scan FS1 are each a scan over an entire surface of the touch panel 1. The touch panel controller 3 captures detection data in RAM 305 as a result of the normal scan NS1 and the noise-detection scan FS1, and then provides a touch-panel-scan-completion report RP1 to the subprocessor 5(Stp1).

The subprocessor 5 having received the touch-panel-scan-completion report RP1 reads from RAM 305 of the touch panel controller 3 detection data by the normal scan NS1 and the noise-detection scan FS1 respectively (Str1).

The subprocessor 5 sends the touch panel controller 3 a subsequent touch detection condition (working condition ST2), and a subsequent touch-panel-scan-start instruction (TP scan-start instruction IS2) (Ssm2), and then analyzes results of normal scan NS1 read out in the step Str1 (NAL1), and analyzes results of noise-detection scan FS1 (FAL1). In analyzing results of normal scan, a touch judgment is performed based on detection data. In analyzing results of noise-detection scan, a judgment on whether an accumulation value of extraneous noises on detection data owing to the integrating action is large or small is made. While the results are analyzed, the touch panel controller 3 performs a subsequent normal scan NS2 and a subsequent noise-detection scan FS2. After that, the following steps are performed in turn in the same way: transmission of TP scan completion report RP2 and TP scan results RSLT2 (Str2); transmission of a working condition ST3 and a TP scan-start instruction IS3 (Ssm3); analysis of normal scan results NAL2; analysis of noise detection results FAL2; normal scan DA3; and noise-detection scan FS3.

For instance, a detection cycle and a detection period are changed to perform the noise-detection scans FS1, FS2, FS3 three times respectively. Then, among analysis results obtained by noise detection result analyses FAL1, FAL2, . . . of the respective noise-detection scans FS1, FS2, FS3, a combination of a detection cycle and a detection period which involves the smallest accumulation value of extraneous noise is taken as an optimum touch detection condition. The detection condition thus taken is used for scan setting of a later normal scan with a required timing. Specifically, based on data according to detection cycles and detection periods obtained as a result of the noise-detection scan, the subprocessor 5 makes an assessment concerning what detection cycle Tdc is most nearly in the first relation in which the detection cycle is equal to a cycle of an odd multiple of a half of the cycle of extraneous noise NR having a cycle of 1/m of the display-scan cycle Tsync, and what detection period Tdt is most nearly in the second relation in which the detection period is equal to a period of an integer multiple of a cycle of the extraneous noise NR. In making a determination on a touch position, the subprocessor 5 makes the control to make a judgment on a touch so as to use detection data formed by a detection cycle Tdc and a detection period Tdt determined to be most nearly in the relations as results of the assessments.

The touch sequence of FIG. 7 for coping with extraneous noises is positioned as an example of the error canceling method for canceling out error components by use of periodic extraneous noises NR superposed on the X-electrode Xn in the integrating action of periodically integrating a signal arising on the X-electrode Xn of a capacitance having the Y-electrode Ym and the X-electrode Xn in synchronization with the display-scan cycle Tsync. That is, the steps Ssm1, Ssm2, Ssm3 of the working condition settings ST1, ST2, ST3, . . . correspond to: the first step of preparing set data of the detection cycle Tdc; and the third step of preparing detection-period-set data which defines a detection period Tdt of a detection cycle. The steps of noise detection result analyses FAL1, FAL2 correspond to: the second step of discriminating data suitable for canceling the error components to obtain results of the integrating action from integration-cycle-set data prepared by the first step; and the fourth step of discriminating data suitable for canceling the error components to obtain results of the integrating action from detection-period-set data prepared by the third step. The suitable data discriminated by the second step make integration-cycle-set data specifying an integration cycle most nearly in the relation in which the integration cycle is equal to a cycle of an odd multiple of a half of the cycle of extraneous noise having a cycle of 1/m of the reference cycle. Likewise, the suitable data discriminated by the fourth step make integration-period-set data specifying an integration period most nearly in relation in which the integration period is equal to a period of an integer multiple of a cycle of the extraneous noise.

FIG. 8 shows an example of the action timing of the normal scan. In this scan, a detection cycle Tdc and a detection period Tdt are both controlled in order to curb extraneous noises. G1 to G640, and D1 to D1440 denote signals which the display controller 4 outputs to the display panel 2, whereby pieces of image information are written into the display panel 2. This action produces drive noises in connection with the liquid crystal display, a period shown by a pulse-drive period Tgp is unsuitable for touch detection. That is, the touch detection is performed in a period left as a result of removal of a pulse-drive period Tgp from the period (cycle of Hsync) of a display-scan cycle Tsync. In this example, the detection period Tdt is a period during which the X-electrode Xn is connected with the corresponding integration circuit with the switch SW2 of FIG. 18 in OFF state. The detection cycle Tdc is a pulse cycle of the switch SW2 in a period Tsync. The Y-electrode Ym is slightly delayed from the timing of the switch SW2 being turned OFF, but driven with the same cycle. The reason for slight delay is that electric charge is injected after connecting between the X-electrode Xn and the corresponding integration circuit. VOUTn denotes an output of the integration circuit of FIG. 18, which is a signal resulting from the accumulation of the influence of the electric charge injection from the Y-electrode Ym.

Figure 9:
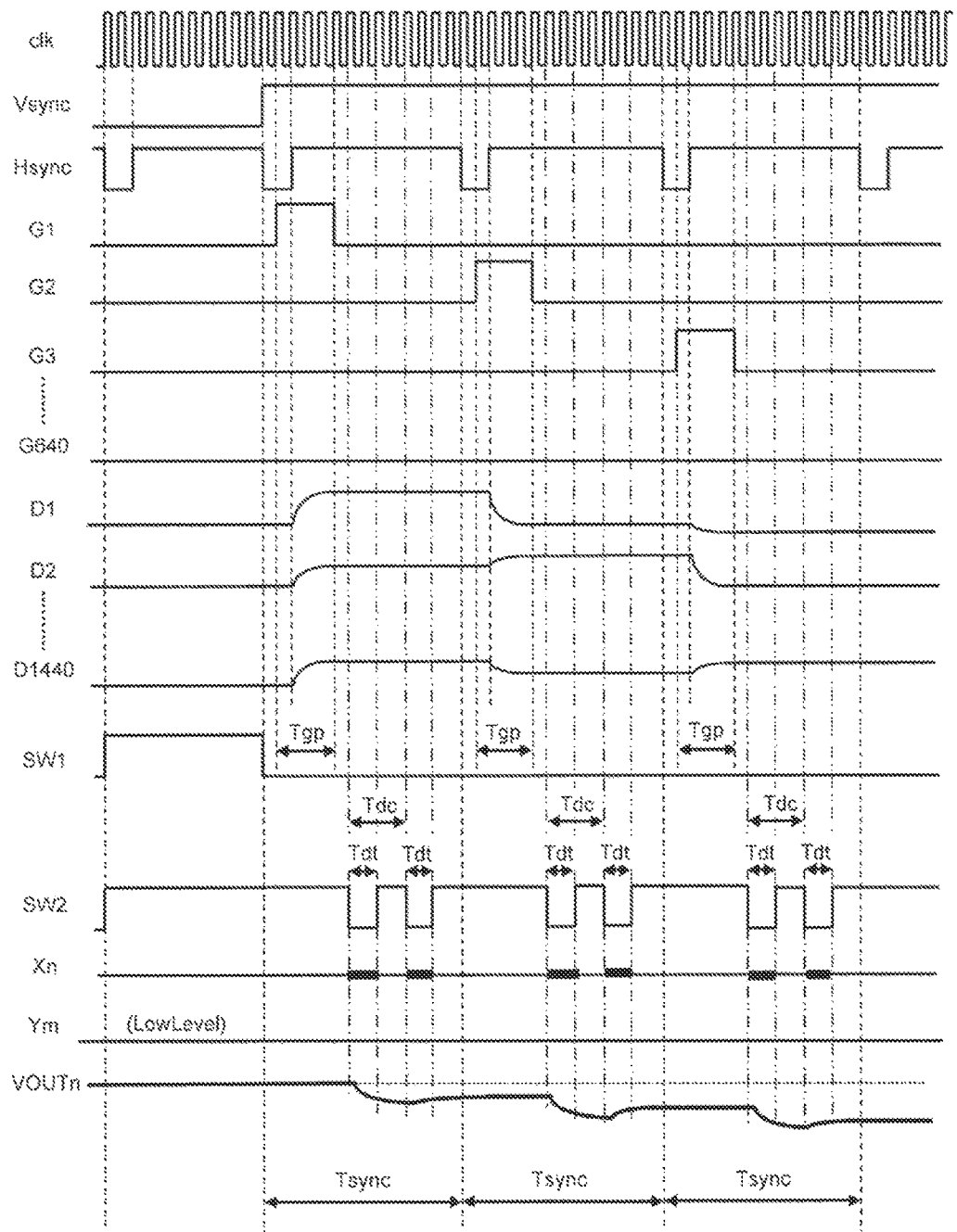
FIG. 9 is a timing diagram showing, by example, action timing waveforms at the time of noise detection scan in connection with FIG. 7.

FIG. 9 shows, by example, action timing waveforms in the noise-detection scan in description made with reference to FIG. 7. Of the waveforms of FIG. 9, the waveforms are the same as those of FIG. 8 except the waveforms on the Y-electrode Ym and the signal output VOUTn. In the noise-detection scan, the switch SW2 is caused to work in the same way as in the normal scan, but the Y-electrode Ym is not driven. Thus, the integrating action is to be performed without injecting electric charges from the Y-electrode Ym. In other words, only information according to the influence of extraneous noises will be accumulated on the signal output VOUTn. That is, the analyses of extraneous noises do not require that the presence or absence of a touch be factored in, which makes easier to discriminate the presence or absence of a touch, and makes possible to contribute to the increase in the accuracy of the discrimination.

In regard to results of the noise-detection scan, whether or not the influence of extraneous noise is canceled out can be determined based on values of results of accumulation of the influences of extraneous noises. In other words, an assessment will be made on whether a combination of the set detection cycle Tdc and detection period Tdt is effective in canceling extraneous noises or not. Therefore, it becomes possible to search for an optimum detection condition which minimizes a result of accumulation of the influence of extraneous noise. As a result, considering that remarkable extraneous noise worsening the accuracy of touch detection satisfies Tnr=Tsync/m, it becomes possible to determine a touch position by use of optimum detection cycle and detection period based on results of the assessment even with the extraneous noise.

The following are possible: to perform the action of sequentially switching the touch detection condition as shown in the sequence diagram of FIG. 7 at given intervals; and to determine a condition which minimizes the result of accumulation of the influence of extraneous noise based on results thereof, and use the condition as an optimum condition for the next touch detection. The steps as described below may be made: to perform the action of sequentially switching the touch detection condition as shown in the sequence diagram of FIG. 7 only when the subprocessor 5 directs according to a software program, and then perform a reassessment concerning the touch detection condition thereby to optimize the touch detection condition. In addition, as shown in FIG. 7, by example, a procedure including the following steps may be adopted: performing noise-detection scan and normal scan for setting detection cycles and detection periods respectively every time; and selecting, from results of these scans, an optimum normal scan result to use it for determination of a touch position.

Accuracy of Control of the Detection Cycle by Setting

Figure 11:
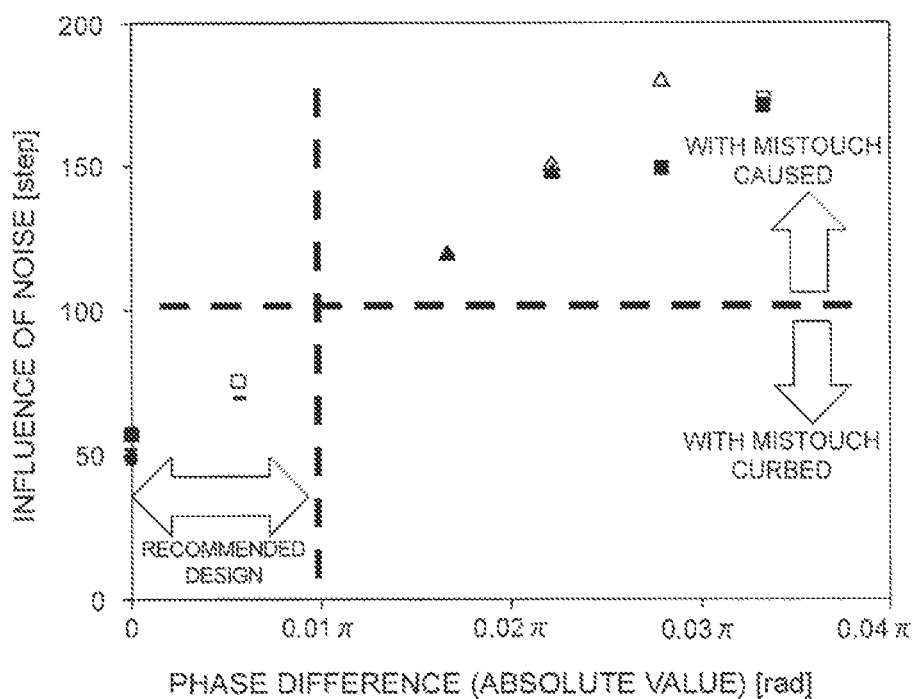
FIG. 11 is an explanatory diagram showing, by example, the relation between a phase difference when an attempt is made to make setting for curbing noise by use of a detection cycle Tdc, namely a difference between a theoretical value of the set detection cycle Tdc and an actual set value which is divided by Tsync, and the occurrence of mistouch detection (error action) owing to the influence of extraneous noise.

FIG. 11 shows, by example, the relation between a phase difference when an attempt is made to mitigate noise by use of the detection cycle Tdc. Namely a difference between a theoretical value of the set detection cycle Tdc and an actual set value which is divided by Tsync, and the occurrence of mistouch detection (error action) owing to the influence of extraneous noise.

As shown in FIG. 11, by example, it is expected that there is a high probability that the deviation of setting a detection cycle larger than 0.5% causes a mistouch. With reference to FIG. 11, there is a boundary between the occurrence of a mistouch and the occurrence of no mistouch: Phase Difference>0.01π[rad]/2π[rad]=0.5%. At 100 step in the noise influence of the vertical axis, a mistouch is estimated to have occurred. According to this, the detection cycle Tdc is adjusted so as to be able to switch with an accuracy smaller than 25 μs×0.01π/2π=125 ns on the assumption that a system performs the action of liquid crystal display of e.g. Tsync=25 μs. Therefore, to arrange the accuracy of setting the detection cycle so that its error can be kept down at no more than 0.5% contributes to facilitating setting a detection cycle which can curb extraneous noises.

The invention is not limited to the above embodiments. It is obvious that various changes or modifications may be made without departing from the subject matter thereof.

For instance, the touch panel is not limited to have an in-cell structure with the display panel. The embodiment in which the detection cycle and the detection period are adjusted in combination, which has been described above, is just an example. It is obvious that various changed and modifications may be made appropriately.

In the integrating action of periodically integrating a signal arising on the second electrode of a capacitance having the first and second electrodes in synchronization with a reference cycle, an error canceling method for canceling out error components originating from periodic extraneous noise superposed on the first electrode is not limited to the application to touch detection. It is obvious that the error canceling method can be applied to other appropriate circuits.

In addition, the integrating action by the touch panel controller is one embodiment of the periodic capturing action of periodically capturing signals arising on detection electrodes through capacitance components between drive electrodes (Y1 to YM) and detection electrodes (X1 to XN) of the touch panel. The capturing action is not limited to the integrating action, and it may be an averaging process or the like for sequentially averaging signals arising on the detection electrodes. In short, the capturing action may be an operation to process signals arising on the detection electrodes so as to accumulate the signals.

It is obvious that the detection cycle and the detection period may be individually set or specified in appropriate combination. Further, it is obvious that the detection period may be made fixed, and only the detection cycle may be set variably within a range of various possible cycles.

What is claimed is:

1. A semiconductor device comprising:
a capacitive sensing controller operable to:
periodically capture sensing signals using one or more detection electrodes to generate data for detecting an object proximate to the detection electrodes, wherein the sensing signals are captured during detection periods in periodic detection cycles, each detection cycle defining a period of time between consecutive detection periods, and wherein a single drive pulse is applied to the detection electrodes during each of the detection periods; and
a processor operable to set a duration of the detection cycles,
wherein the duration of the detection cycles is an odd multiple greater than one of a half a duration of a display-scan cycle defined by timing signals or an odd multiple of half of 1/m (where m is an integer greater than one) of the duration of the display-scan cycle,
wherein a duration of the detection periods is an integer multiple of 1/n of the display-scan cycle (where n is a positive integer),
wherein the duration of the detection cycles is longer than the duration of the detection periods, and
wherein n is selected based on a periodic noise signal.

2. The semiconductor device according to claim 1, wherein the processor is operable to determine a value of the m based on a periodic noise signal.

3. The semiconductor device according to claim 1, wherein in the capacitive sensing controller a duration of each of the detection periods is specified by detection-period-set data.

4. The semiconductor device according to claim 3, wherein the processor is operable to determine a value of n based on identifying a value of the duration of the detection periods that is substantially the same as an integer multiple of a cycle period of the periodic noise signal.

5. The semiconductor device according to claim 3, wherein the processor has a non-volatile memory comprising:
   detection-cycle-set data for specifying 1/m of a display-scan cycle, and detection-period-set data for specifying the integer multiple of 1/n of the display-scan cycle, wherein the detection-cycle-set data and detection-period-set data are rewritably stored in the non-volatile memory.

6. The semiconductor device according to claim 1, wherein by using the duration of the detection cycles, the capacitive sensing controller is configured to:
   align a first one of the consecutive detection periods with a positive portion of a periodic noise signal; and
   align a second one of the consecutive detection periods with a negative portion of the periodic noise signal, wherein the positive portion and the negative portion have similar magnitudes.

7. The semiconductor device according to claim 1, wherein the processor has a non-volatile memory, and
   detection-period-set data for specifying 1/m of the display-scan cycle is rewritably stored in the non-volatile memory.

8. The semiconductor device according to claim 1, further comprising:
   a display controller operable to supply graduation signals to signal electrodes of a display panel in synchronization with capturing the sensing signals using the one or more detection electrodes in each display-scan cycle of the display panel.

9. The semiconductor device according to claim 1, wherein the capacitive sensing controller performs touch detection and noise detection using the detection cycles, wherein:
   during touch detection, the capacitive sensing controller drives a drive electrode to capture the sensing signals,
   during noise detection the capacitive sensing controller stops driving the drive electrode to capture the sensing signals,
   the processor is operable to determine the duration of the detection cycles based on measured during noise detection.

10. The semiconductor device according to claim 9, wherein the capacitive sensing controller is operable to set a duration of the detection periods to perform the touch detection and noise detection,
   wherein the duration of the detection periods is an integer multiple of 1/n of the display-scan cycle (where n is a positive integer).

11. A semiconductor device comprising:
   a display controller operable to update a display panel in synchronization with a display-scan cycle; and
   a capacitive sensing controller operable to detect detection data according to capacitance between drive and detection electrodes by periodically capturing sensing signals on the detection electrodes, wherein detecting the detection data is synchronized with the display-scan cycle,
   wherein the capacitive sensing controller performs the periodic capture during detection periods in periodic detection cycles, each detection cycle defining a period of time between consecutive detection periods,
   wherein a single drive pulse is applied to the detection electrodes during each of the detection periods,
   wherein a duration of the detection cycles is an odd multiple greater than one of a half a duration of a display-scan cycle defined by timing signals or an odd multiple of half of 1/m (where m is an integer greater than one) of the duration of the display-scan cycle,
   wherein a duration of the detection periods is an integer multiple of 1/n of the display-scan cycle (where n is a positive integer),
   wherein the duration of the detection cycles is longer than the duration of the detection periods, and
   wherein n is selected based on a periodic noise signal.

12. A noise reduction method, comprising:
   capturing sensing signals using one or more detection electrodes to generate detection data associated with an object proximate to the detection electrodes, wherein the sensing signals are captured during detection periods in periodic detection cycles, each detection cycle defining a period of time between consecutive detection periods, and wherein a single drive pulse is applied to the detection electrodes during each of the detection periods; and
   setting a duration of the detection cycles such that a duration of the detection cycles is an odd multiple greater than one of a half a duration of a display-scan cycle defined by timing signals or an odd multiple of half of 1/m (where m is an integer greater than one) of the duration of the display-scan cycle,
   wherein a duration of the detection periods is an integer multiple of 1/n of the display-scan cycle (where n is a positive integer),
   wherein the duration of the detection cycles is longer than the duration of the detection periods, and
   wherein n is selected based on a periodic noise signal.

13. The noise reduction method according to claim 12, further comprising:
   determining a value of m based on a cycle period of a periodic noise signal.

14. The noise reduction method according to claim 12, further comprising:
   determining a value of n based on identifying a value of the duration of the detection periods that is substantially the same as an integer multiple of a cycle period of a periodic noise signal.

15. The noise reduction method according to claim 12, further comprising:
   aligning a first one of the consecutive detection periods with a positive portion of a periodic noise signal; and
   aligning a second one of the consecutive detection periods with a negative portion of the periodic noise signal, wherein the positive portion and the negative portion have similar magnitudes.

16. The noise reduction method according to claim 15, further comprising:
   performing noise detection using the one or more detection electrodes to generate noise data; and
   identifying a periodic noise signal using the noise data.

17. The noise reduction method according to claim 12, wherein the display-scan cycle defines a time used to update one line of a display using a single gate electrode, wherein the detection cycle is within the display-scan cycle.

18. The noise reduction method according to claim 12, further comprising:
   supply gradation signals to signal electrodes of a display panel in synchronization with capturing the sensing signals using the one or more detection electrodes in each display-scan cycle of the display panel.

* * * * *